United States Patent
Saito

(10) Patent No.: US 10,080,001 B2
(45) Date of Patent: Sep. 18, 2018

(54) VIDEO PROJECTION APPARATUS CAPABLE OF REALIZING STABLE ROCKING ANGLE AT OPTIMUM RESONANT FREQUENCY

(71) Applicant: STANLEY ELECTRIC CO., LTD., Meguro-ku, Tokyo (JP)

(72) Inventor: Takao Saito, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 155 days.

(21) Appl. No.: 15/294,444

(22) Filed: Oct. 14, 2016

(65) Prior Publication Data
US 2017/0127033 A1    May 4, 2017

(30) Foreign Application Priority Data
Oct. 28, 2015    (JP) ................. 2015-212152

(51) Int. Cl.
*H04N 9/31*    (2006.01)
*G02B 26/08*    (2006.01)
(Continued)

(52) U.S. Cl.
CPC ....... *H04N 9/3129* (2013.01); *G02B 26/0858* (2013.01); *G02B 26/101* (2013.01); *G02B 26/127* (2013.01); *H04N 9/3135* (2013.01); *H04N 9/3155* (2013.01); *H04N 9/3164* (2013.01); *H04N 9/3185* (2013.01); *H04N 9/3194* (2013.01)

(58) Field of Classification Search
CPC ................. G02B 26/0858; G02B 26/101; G02B 26/127; H04N 9/3129; H04N 9/3135; H04N 9/3194
See application file for complete search history.

(56) References Cited

U.S. PATENT DOCUMENTS 7,239,436 B2 *    7/2007    Oettinger ............. G02B 26/101
                                                        359/200.7
7,252,394 B1 *    8/2007    Fu ........................ G03B 21/28
                                                        348/E9.026
(Continued)

FOREIGN PATENT DOCUMENTS

JP    2007086626 A    4/2007

OTHER PUBLICATIONS

Extended European Search Report (EESR) dated Feb. 21, 2017 issued in counterpart European Application No. 16194598.5.

*Primary Examiner* — Bao-Luan Le
(74) *Attorney, Agent, or Firm* — Holtz, Holtz & Volek PC

(57) ABSTRACT

A video projection apparatus includes: an optical deflector having a mirror projecting a first view field and projecting a second view field, an actuator for rocking the mirror and a sensor; an optical guide unit provided within the second view field; a photodetector; and a control unit. The control unit is adapted to calculate a resonant frequency of the sinusoidal-wave voltage; detect a first timing point from a sense voltage; detect a second timing point from a photo detection voltage when the second light beam is incident to the optical guide unit; calculate a time period from the first timing point to the second timing point; calculate a product value between the time period and the resonant frequency; and control an amplitude of the sinusoidal-wave voltage.

12 Claims, 18 Drawing Sheets

(51) Int. Cl.
  *G02B 26/10* (2006.01)
  *G02B 26/12* (2006.01)

(56) References Cited

U.S. PATENT DOCUMENTS

| | | | | |
|---|---|---|---|---|
| 7,599,011 B2* | 10/2009 | Oettinger | ............ | G02B 26/101 |
| | | | | 348/739 |
| 7,920,213 B2* | 4/2011 | Oettinger | ............ | H04N 9/3129 |
| | | | | 347/235 |
| 7,972,014 B2* | 7/2011 | Hung | ............ | H04N 9/3129 |
| | | | | 353/69 |
| 8,493,289 B2* | 7/2013 | Overmann | ............ | G01J 1/32 |
| | | | | 345/204 |
| 8,670,170 B2* | 3/2014 | Chou | ............ | G02B 26/101 |
| | | | | 250/201.1 |
| 8,905,553 B2* | 12/2014 | Lin | ............ | H04N 9/3161 |
| | | | | 353/85 |
| 9,693,029 B1* | 6/2017 | Jackson | ............ | H04N 9/14 |
| 9,832,434 B2* | 11/2017 | Hofmann | ............ | G02B 26/0841 |
| 2007/0041069 A1* | 2/2007 | Oettinger | ............ | G02B 26/101 |
| | | | | 359/213.1 |
| 2009/0059179 A1* | 3/2009 | Kobori | ............ | G03B 21/28 |
| | | | | 353/52 |
| 2010/0033691 A1* | 2/2010 | Hung | ............ | H04N 9/3129 |
| | | | | 353/70 |
| 2011/0273629 A1* | 11/2011 | Kobori | ............ | G03B 21/28 |
| | | | | 348/744 |
| 2012/0154882 A1* | 6/2012 | Chou | ............ | G02B 26/0841 |
| | | | | 359/205.1 |

* cited by examiner

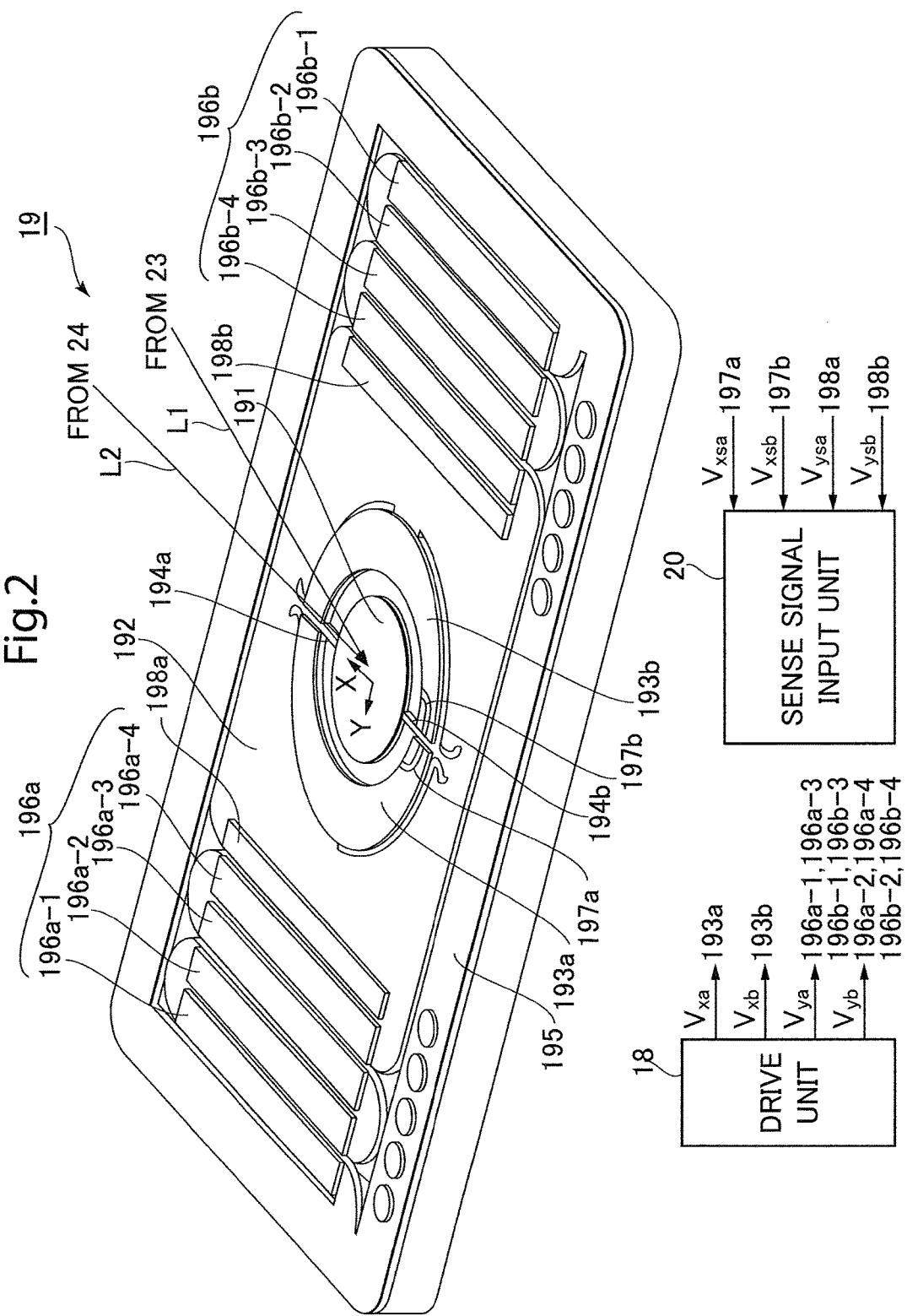

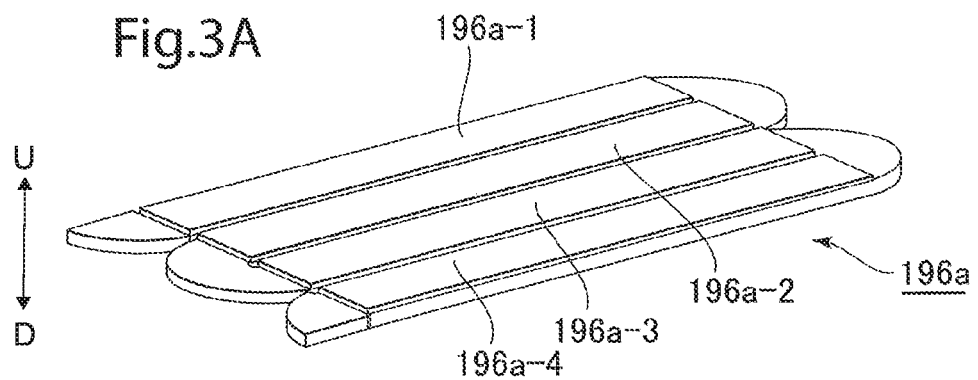
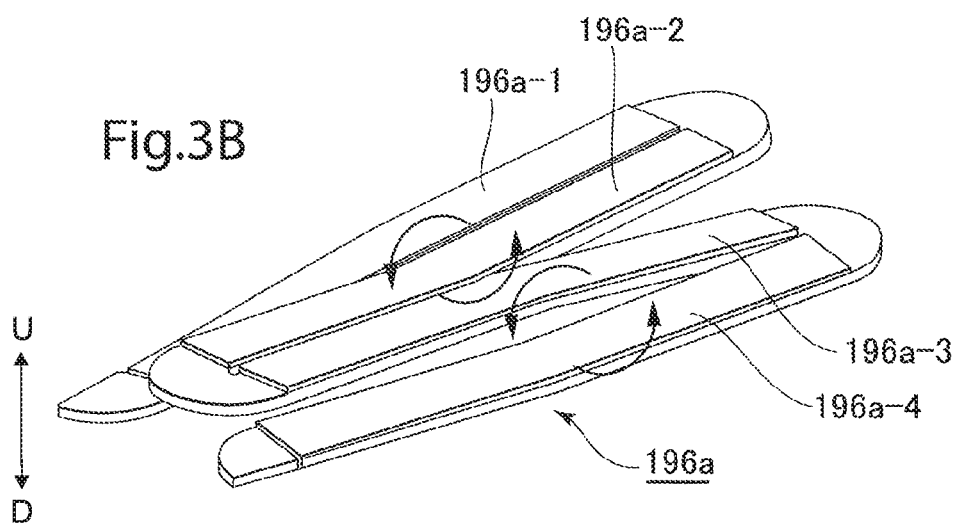

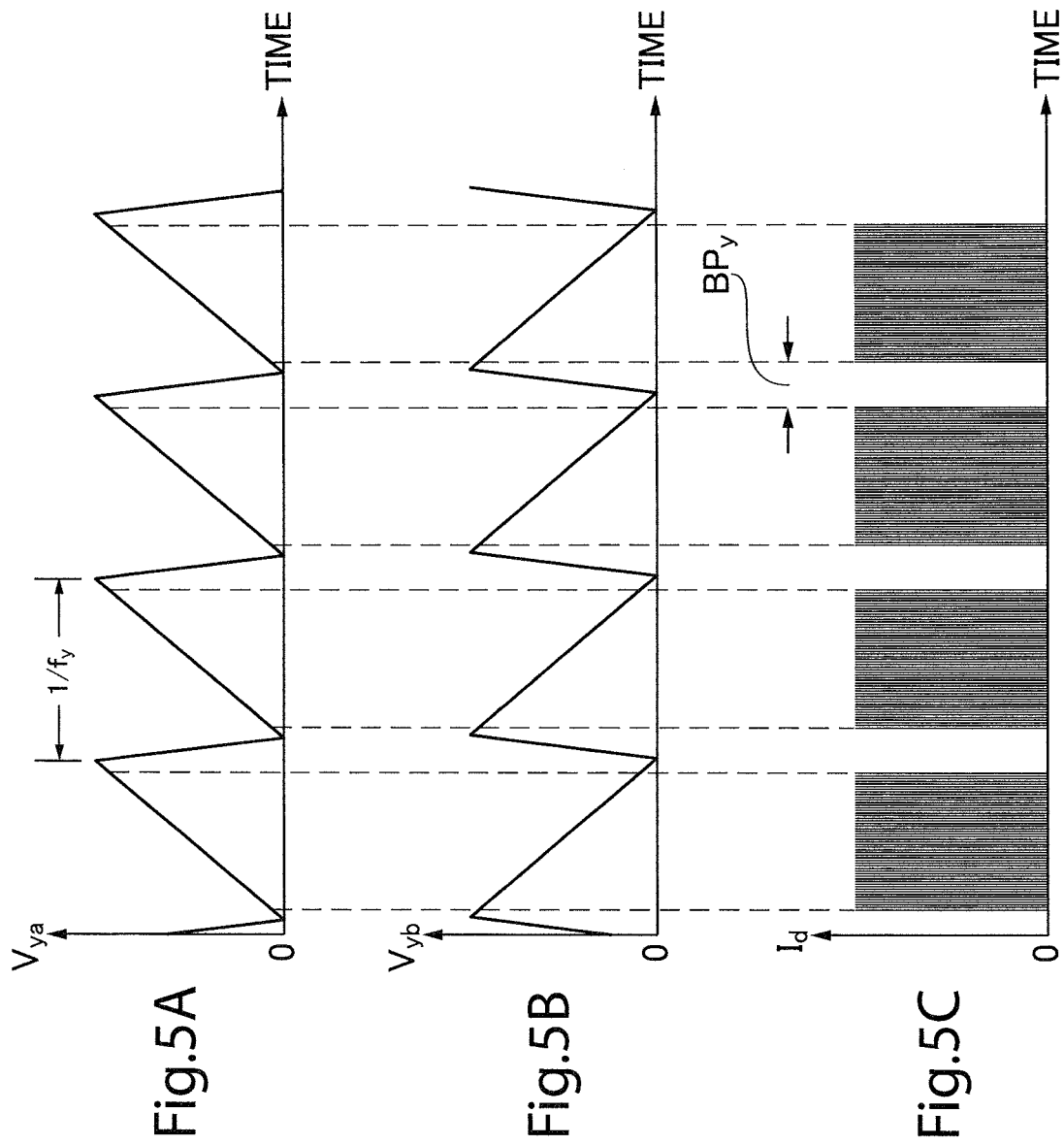

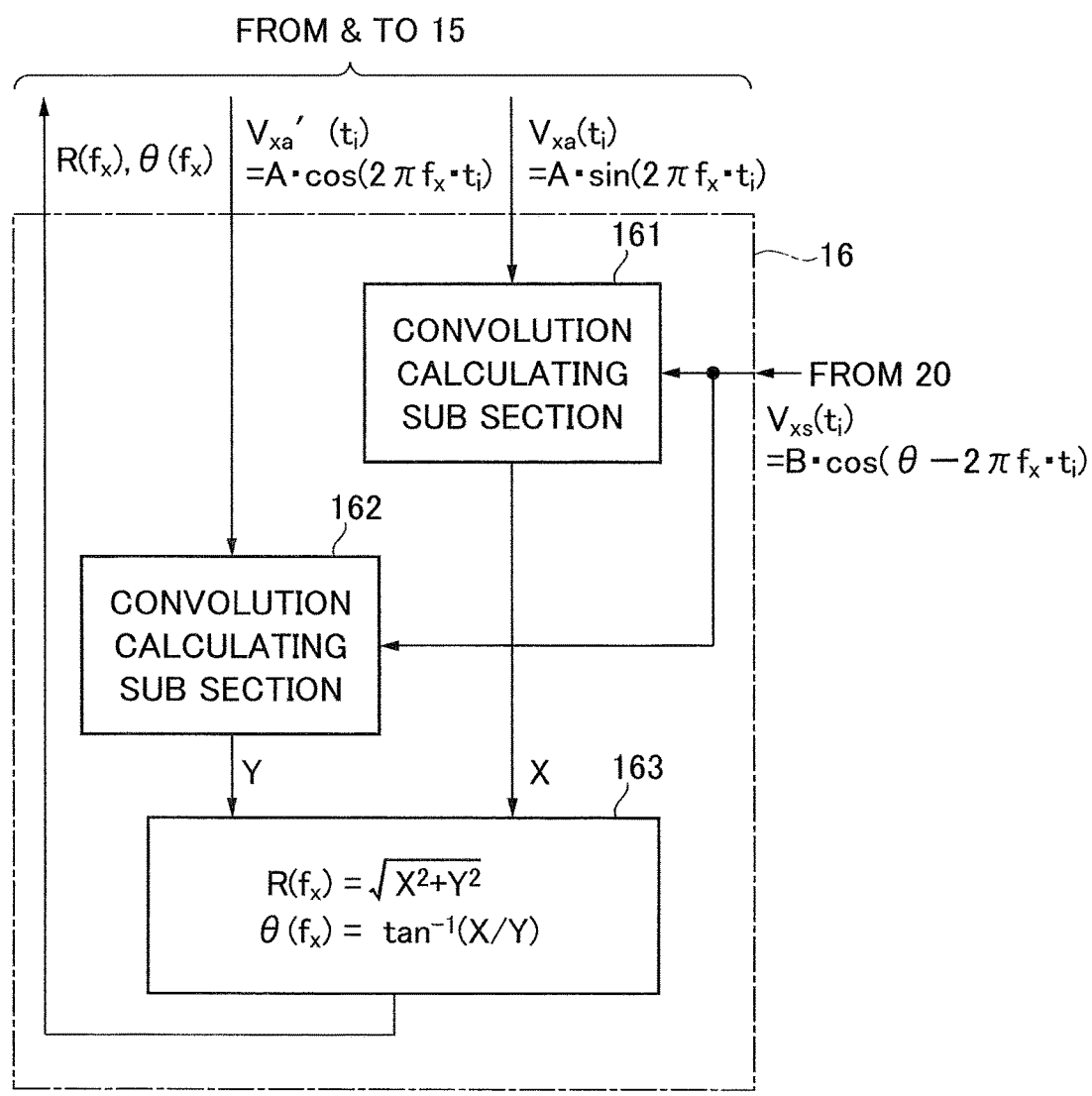

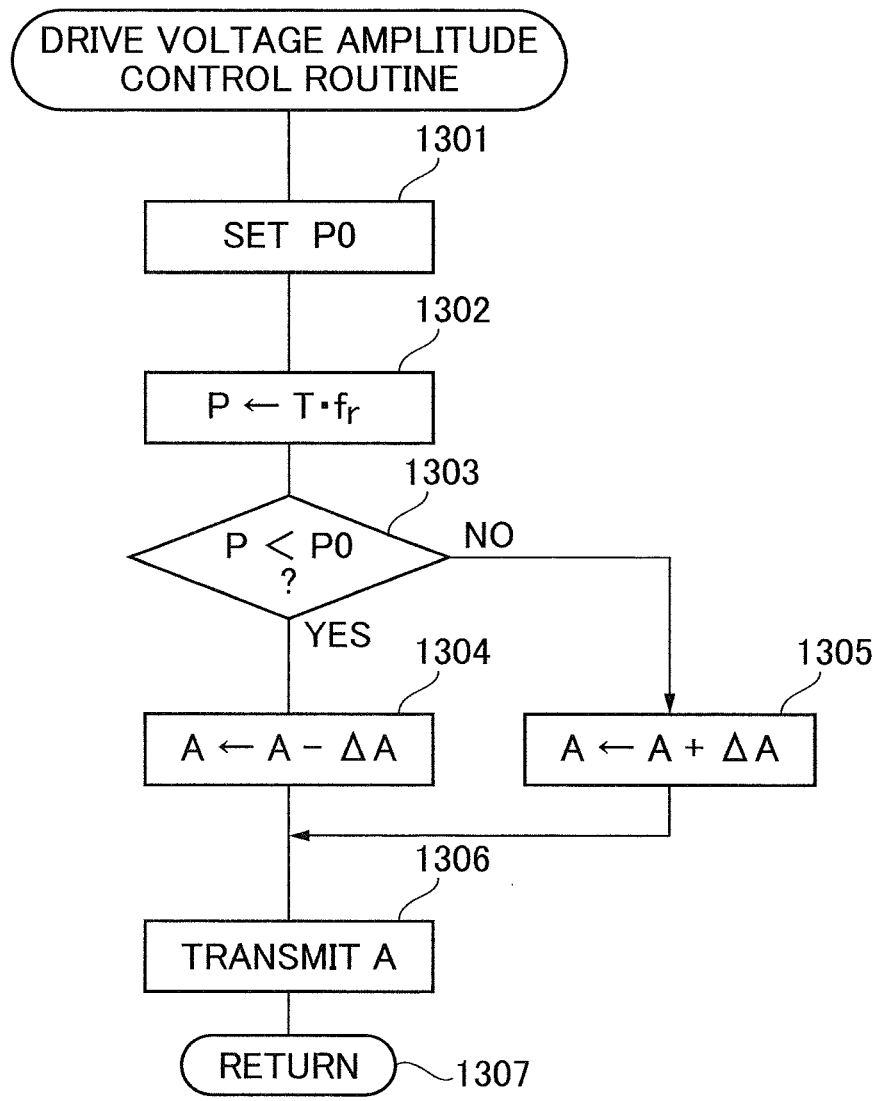

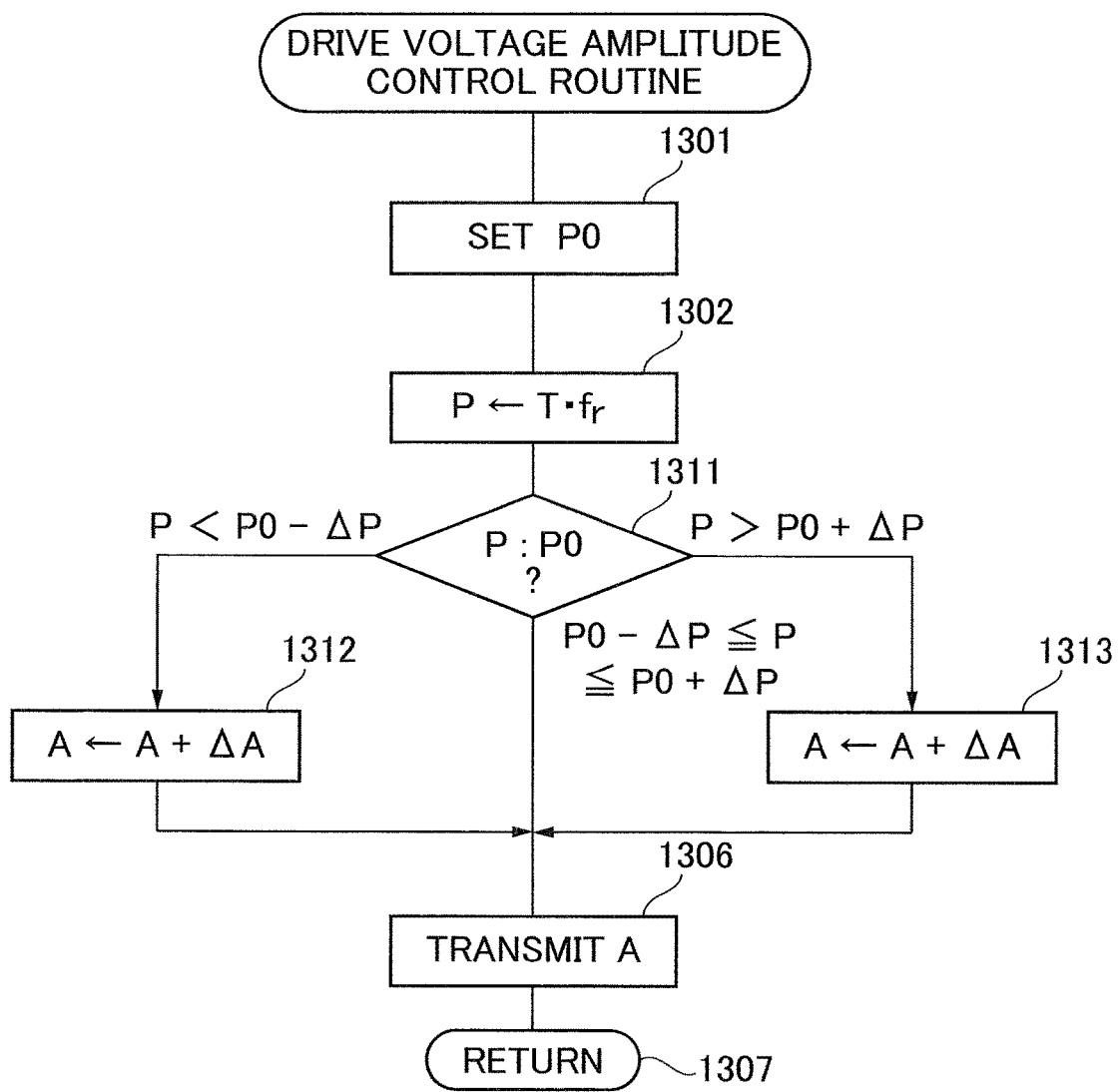

US 10,080,001 B2

VIDEO PROJECTION APPARATUS CAPABLE OF REALIZING STABLE ROCKING ANGLE AT OPTIMUM RESONANT FREQUENCY

This application claims the priority benefit under 35 U.S.C. § 119 to Japanese Patent Application No. JP2015-212152 filed on Oct. 28, 2015, which disclosure is hereby incorporated in its entirety by reference.

BACKGROUND

Field

The presently disclosed subject matter relates to a video projection apparatus. The video projection apparatus can be used as a pico projector, a head mount display (HMD) unit, a head up display (HUD) unit and the like.

Description of the Related Art

A video projection apparatus is constructed by a light source and an optical deflector using a digital mirror device (DMD), a liquid crystal on silicon (LCOS (trademark)) device or a micro electro mechanical system (MEMS) device.

In an optical deflector using a DMD or an LCOS device, spatial light is always incident from the light source onto the entire DMD or the entire LCOS device. As a result, a view field having a fixed horizontal angle and a fixed vertical angle can always be projected at a fixed screen. In this case, each element of the DMD or LCOS device is switched ON or OFF, so that ON-light reflected from the switched-ON element is used for projection, while OFF-light from the switched-OFF element is reflected or absorbed by an optical filter or a light absorber to dump the OFF-light. Thus, utilization of light is low.

On the other hand, in a MEMS optical deflector, a fixed screen is scanned two-dimensionally with a light ray (beam) generated from the light source which light beam is switched ON and OFF, so that utilization of light can be high.

However, since the MEMS optical deflector is susceptible to electromagnetic interference (EMI) noises and external noises by environmental factors such as the temperature and the humidity, a resonant frequency would be changed. As a result, it is difficult to accurately control a projected view field.

A prior art MEMS micromirror scanner has a photodetector disposed at an end shifted from the center of a projected view field to detect a rocking angle of a micromirror. Generally, the rocking angle of a micromirror depends on the temperature, i.e., the higher the temperature, the smaller the rocking angle. Therefore, the rocking angle can be adjusted on the basis of the timing position of the output voltage of the photodetector with respect to the center of the projected view field under the condition that the frequency of the drive voltage for the MEMS micromirror scanner is fixed at a definite resonant frequency of the micromirror (see: JP2007-86626A).

In the above-described prior art MEMS micromirror scanner, however, as stated above, the resonant frequency of the micromirror would be changed. Therefore, it is impossible to determine whether the deviation of the rocking angle is due to the deviation of the drive voltage for electrostatically driving the micromirror or due to the deviation of the resonant frequency of the micromirror.

In FIG. 16A, which shows an ideal state of the rocking angle of the micromirror, the rocking angle $\phi$ varies at a resonant frequency $f_r$ ($=1/T_r$). When $\phi=\phi_{pd}$, the photodetector generates an output voltage $V_{pd}$ at time t1, so that the maximum rocking angle $\phi$ is a desired rocking angle $\phi_d$. Also, in FIG. 16B, which shows a drive voltage deviation state where the drive voltage for the MEMS optical scanner is deviated to the lower side, when $\phi=\phi_{pd}$, the photodetector generates its output voltage $V_{pd}$ at time t2 later than time t1, and also, the maximum rocking angle $\phi$ is smaller than the desired rocking angle $\phi_d$. In this case, the drive voltage is controlled to be increased, so that time t2 is brought close to time t1. Thus, the maximum rocking angle $\phi$ is brought close to the desired rocking angle $\phi_d$. On the other hand, in FIG. 16C, which shows a resonant frequency deviation state where the resonant frequency is $f_r'$ ($=1/T_r'$) smaller than $f_r$, when $\phi=\phi_{pd}$, the photodetector also generates its output voltage $V_{pd}$ at time t3 later than time t1, and also, the maximum rocking angle $\phi$ is smaller than the desired rocking angle $\phi_d$. Therefore, the drive voltage is controlled to be increased, so that time t3 is brought close to time t1. In this case, however, the maximum rocking angle $\phi$ is beyond the desired rocking angle $\phi_d$.

Further, the electromagnetic interference (EMI) noises and external noises by environmental factors such as the temperature and the humidity would affect the operation of a control unit for controlling the micromirror scanner. Therefore, the above-described micromirror scanner would not be operated at its optimum resonant frequency of the micromirror. As a result, if the resonant frequency is deviated, the desired rocking angle of the micromirror would be unstable.

SUMMARY

The presently disclosed subject matter seeks to solve the above-described problems.

According to the presently disclosed subject matter, a video projection apparatus includes: an optical deflector having a mirror for reflecting a first light beam to project a first view field and reflecting a second light beam different from the first light beam to project a second view field which is not superposed onto the first view field, an actuator for rocking the mirror with an axis of the mirror and a sensor provided in the vicinity of the actuator; an optical guide unit provided within the second view field and located along a direction shifted from a center line of the second view field; a photodetector coupled to the optical guide unit; and a control unit adapted to apply a first sinusoidal-wave voltage to the actuator. The control unit is further adapted to calculate a resonant frequency of the first sinusoidal-wave voltage; detect a first timing point from a sense voltage of the sensor; detect a second timing point from a photo detection voltage of the photodetector when the second light beam is incident to the optical guide unit; calculate a time period from the first timing point to the second timing point; calculate a product value between the time period and the resonant frequency; and control an amplitude of the first sinusoidal-wave voltage so that the product value is brought close to a predetermined value.

According to the presently disclosed subject matter, since a resonant frequency is calculated, the resonant frequency can always be optimum. Therefore, even when the drive voltage is deviated and also, the resonant frequency deviated, the projected view field can accurately be controlled.

BRIEF DESCRIPTION OF THE DRAWINGS

The above and other advantages and features of the presently disclosed subject matter will be more apparent from the following description of certain embodiments, as compared with the prior art, taken in conjunction with the accompanying drawings, wherein:

FIG. 2 is a perspective view of the MEMS optical deflector of FIG. 1;

FIGS. 3A and 3B are perspective views for explaining the operation of the outer piezoelectric actuator of FIG. 2;

FIGS. 5A, 5B and 5C are timing diagrams for explaining the vertical operation of the MEMS optical deflector of FIG. 1;

FIG. 8 is a detailed block diagram of the drive signal processing section of FIG. 1;

FIGS. 13A and 13B are flowcharts for explaining the operation of the drive signal generating section of FIG. 1;

DETAILED DESCRIPTION OF EXEMPLARY EMBODIMENTS

Figure 1:
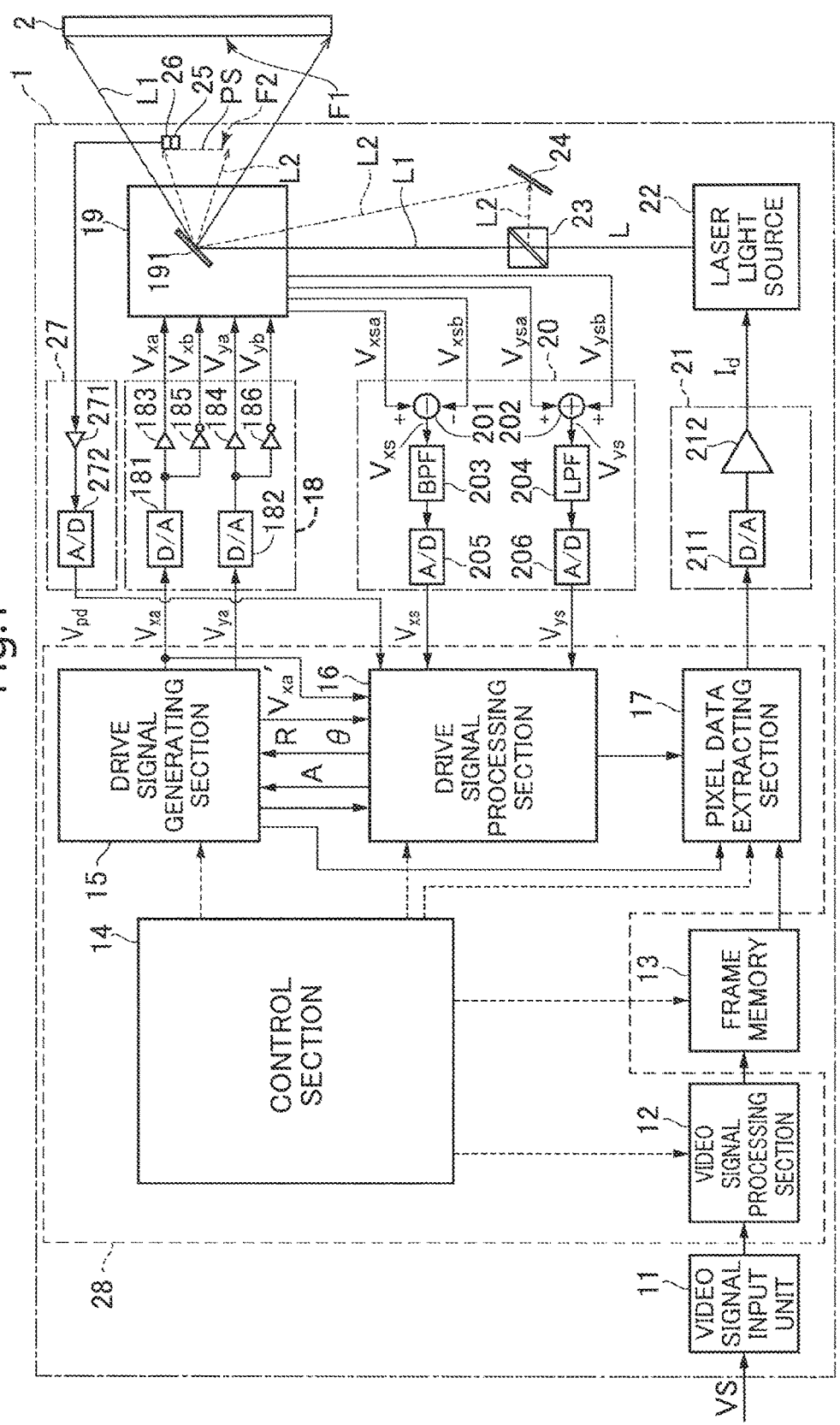
FIG. 1 is a block circuit diagram illustrating an embodiment of the video projection apparatus according to the presently disclosed subject matter.

In FIG. 1, which illustrates an embodiment of the video projection apparatus according to the presently disclosed subject matter, a video projection apparatus 1 receives a video signal VS from a video source such as a personal computer or a camera system to generate a laser beam L1 for a fixed screen 2.

The video projection apparatus 1 is constructed by a video signal input unit 11, a video signal processing section 12, a frame memory 13 and a control section 14 for controlling the video signal processing section 12 and the frame memory 13.

Figure 6:
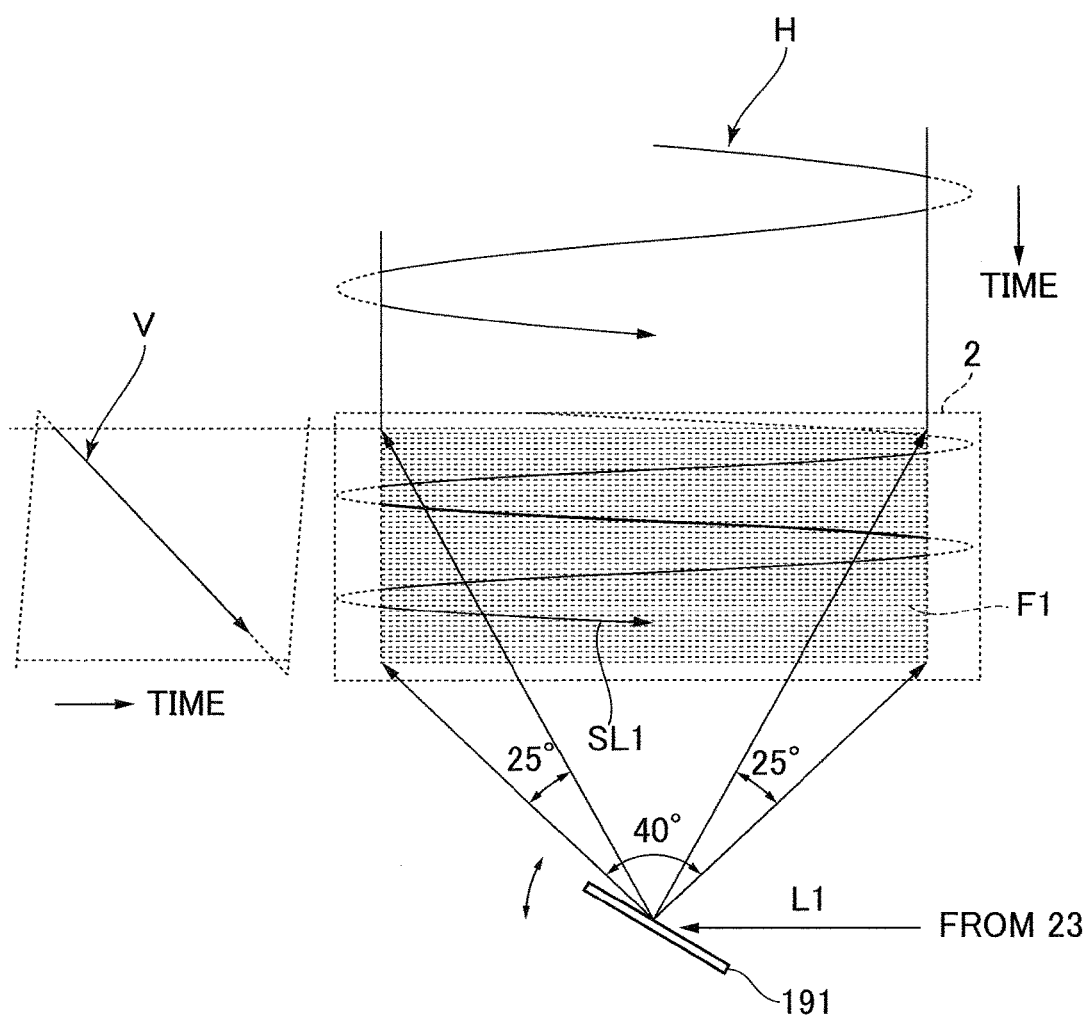
FIG. 6 is a detailed diagram showing a relationship between a scanning locus and a projected view field of the laser beam on the fixed screen of FIG. 1.

The video signal input unit 11 is an analog red/green/blue (RGB) receiver or a digital video signal receiver such as a digital video interface (DVI), a high-definition multimedia interface (HDMI (trademark)) or a digital port. Video signals VS received by the video signal input unit 11 are processed by the video signal processing section 12 and are stored in the frame memory 13 frame by frame. For example, 60 frames per second are stored in the frame memory 13. The frame memory 13 is formed by a high-speed random access memory (RAM) such as an SDRAM, a DDR2 SDRAM or a DDR3 SDRAM. In this case, one frame of the frame memory 13 corresponds to a view field formed by a horizontal angle of 40° and a vertical angle of 25° (see: FIG. 6).

Also, the video projection apparatus 1 is constructed by a drive signal generating section 15, a drive signal processing section 16, and a pixel data extracting section 17.

The drive voltage generating section 15 generates digital drive voltages $V_{xa}$ and $V_{ya}$ which are transmitted via a drive unit 18 formed by digital-to-analog (D/A) converters 181 and 182, amplifiers 183 and 184, and inverters 185 and 186 to a MEMS optical deflector 19. In this case, analog drive voltages $V_{xa}$ and $V_{ya}$ and their inverted drive voltages $V_{xb}$ and $V_{yb}$ are supplied from the drive unit 18 to the MEMS optical deflector 19. Note that the analog drive voltages $V_{ya}$ and $V_{yb}$ are represented by the same denotations of the digital drive voltages $V_{ya}$ and $V_{yb}$, in order to simplify the description. On the other hand, the MEMS optical deflector 19 generates sense voltages $V_{xsa}$, $V_{xsb}$, $V_{ysa}$ and $V_{ysb}$ in response to the flexing angles of the mirror thereof which are supplied via a sense voltage input unit 20 formed by a subtracter 201, an adder 202, a band-pass filter 203, a low-pass filter 204, and analog-to-digital (A/D) converters 205 and 206 to the drive voltage processing section 16. In this case, the band-pass filter 203 removes external noises from the sense voltage $V_{xs}$ (=$V_{xsa}$−$V_{xsb}$) of the subtracter 201, while the low-pass filter 204 removes external noises from the sense voltage $V_{ys}$ (=$V_{ysa}$+$V_{ysb}$) of the adder 202. The A/D converter 205 performs an A/D conversion upon the output voltage of the band-pass filter 203 to transmit a digital sense voltage $V_{xs}$ to the drive voltage processing section 16, while the A/D converter 206 performs an A/D conversion upon the output voltage of the low-pass filter 204 to transmit a digital sense voltage $V_{ys}$ to the drive voltage processing section 16. Note that the digital sense voltages $V_{xs}$ and $V_{ys}$ are represented by the same denotations of the analog output voltages $V_{xs}$ and $V_{ys}$ of the subtracter 201 and the adder 202, in order to simplify the description.

The pixel data extracting section 17 generates a drive signal which is supplied to a light source drive unit 21 formed by a D/A converter 211 and an amplifier 212 for supplying a drive current $I_d$ to a laser light source 22. Note that the light source drive unit 21 and the laser light source 22 can be provided for each of red (R), green (G) and blue (B). Also, the laser light source 22 can be replaced by a light emitting diode (LED) source.

The drive signal generating section 15, the drive signal processing section 16 and the pixel data extracting section 17 are controlled by the control section 14.

In more detail, the drive signal generating section 15 transmits extracting timing signals of pixel data to the pixel data extracting section 17. Also, the drive signal processing section 16 receives the drive voltage $V_{xa}$ and a drive voltage $V_{xa}'$ similar to the drive voltage $V_{xa}$ from the drive signal generating section 15 and the sense voltages $V_{xs}$ and $V_{ys}$ from the sense signal input unit 20 to transmit a delay timing signal to the pixel data extracting section 17 due to the delay transmission of the drive voltages $V_{xa}$ and $V_{ya}$ to the mirror of the MEMS optical deflector 19. Further, the pixel data extracting section 17 extracts pixel data from the frame memory 13 in accordance with the extracting timing signals of the drive signal generating section 15 and the delay signal of the drive signal processing section 16.

The laser light source 22 generates a light beam L which is split by a beam splitter 23 into light beams L1 and L2. The light beam L1 is reflected by the mirror 191 of the MEMS optical deflector 19 to project a view field (first view field) F1 on the fixed screen 2. On the other hand, the light beam L2 is reflected by a fixed mirror 24 and, then is reflected by the mirror 191 of the MEMS optical deflector 19 to project a rocking angle measuring view field (second view field) F2 on a provisional screen PS. Note that the provisional screen PS is not actually provided. Then, the light beam L2 is incident to an optical guide unit 25 located at the rocking angle measuring view field F2. The optical guide unit 25 is coupled to a photodetector 26 such as a photo diode. For example, the optical guide unit 25 is a circular tube made of glass, acryl, polycarbonate or the like. Note that a glass fiber can be provided between the optical guide unit 25 and the photodetector 26. The photo diode 26 is connected to a photo signal receiving section 27 formed by an amplifier 271 and an A/D converter 272, which is further connected to the drive signal processing section 16. When the light beam L2 is incident to the optical guide unit 25, the photo signal receiving section 27 generates a photo detection voltage $V_{pd}$.

Note that the light beam L2 is depicted as superposing onto the light beam L1; however, the light beam L2 is not actually superposed onto the light beam L1, so that the rocking angle measuring view field F2 does not interfere with the projected view field F1.

In FIG. 1, the video signal processing section 12, the control section 14, the drive signal generating section 15, the drive signal processing section 16 and the pixel data extracting section 17 can be formed by a single control unit 28 or a microcomputer using a field-programmable gate array (FPGA), an extensible processing platform (EPP) or a system-on-a-chip (SoC). The control section 14 has an interface function with a universal asynchronous receiver transmitter (UART) and the like.

In FIG. 2, which is a perspective view of the MEMS optical deflector 19 of FIG. 1, the MEMS optical deflector 19 is constructed by a circular mirror 191 for reflecting incident light beams L1 and L2 via the beam splitter 23 and the fixed mirror 24, respectively, an inner frame (movable frame) 192 surrounding the mirror 191 for supporting the mirror 191, a pair of torsion bars 194a and 194b coupled between the mirror 191 and the inner frame 192, a pair of inner piezoelectric actuators 193a and 193b coupled between the inner frame 192 and the mirror 191 and serving as cantilevers for rocking the mirror 191 with respect to an X-axis of the mirror 191, an outer frame (support frame) 195 surrounding the inner frame 192, a pair of meander-type outer piezoelectric actuators 196a and 196b coupled between the outer frame 195 and the inner frame 192 and serving as cantilevers for rocking the mirror 191 through the inner frame 192 with respect to a Y-axis of the mirror 191 perpendicular to the X-axis, piezoelectric sensors 197a and 197b in the proximity of the inner piezoelectric actuators 193a and 193b at an edge of the torsion bar 194b, and piezoelectric sensors 198a and 198b on the inner frame 192 in the proximity of the outer piezoelectric actuators 196a and 196b.

The inner frame 192 is rectangularly-framed to surround the mirror 191 associated with the inner piezoelectric actuators 193a and 193b.

The torsion bars 194a and 194b are arranged along the X-axis, and have ends coupled to the inner circumference of the inner frame 192 and other ends coupled to the outer circumference of the mirror 191. Therefore, the torsion bars 194a and 194b are twisted by the inner piezoelectric actuators 193a and 193b to rock the mirror 191 with respect to the X-axis.

The inner piezoelectric actuators 193a and 193b oppose each other along the Y-axis and sandwich the torsion bars 194a and 194b. The inner piezoelectric actuators 193a and 193b have ends coupled to the inner circumference of the inner frame 192 and other ends coupled to the torsion bars 194a and 194b. In this case, the flexing direction of the inner piezoelectric actuator 193a is opposite to that of the inner piezoelectric actuator 193b.

The outer frame 195 is rectangularly-framed to surround the inner frame 192 via the outer piezoelectric actuators 196a and 196b.

The outer piezoelectric actuators 196a and 196b are coupled between the inner circumference of the outer frame 195 and the outer circumference of the inner frame 192, in order to rock the inner frame 192 associated with the mirror 191 with respect to the outer frame 195, i.e., to rock the mirror 191 with respect to the Y-axis.

The outer piezoelectric actuator 196a is constructed by piezoelectric cantilevers 196a-1, 196a-2, 196a-3 and 196a-4 which are serially-coupled from the outer frame 195 to the inner frame 192. Also, each of the piezoelectric cantilevers 196a-1, 196a-2, 196a-3 and 196a-4 are in parallel with the X-axis of the mirror 191. Therefore, the piezoelectric cantilevers 196a-1, 196a-2, 196a-3 and 196a-4 are folded at every cantilever or meandering from the outer frame 195 to the inner frame 192, so that the amplitudes of the piezoelectric cantilevers 196a-1, 196a-2, 196a-3 and 196a-4 can be changed along directions perpendicular to the Y-axis of the mirror 191.

Similarly, the outer piezoelectric actuator 196b is constructed by piezoelectric cantilevers 196b-1, 196b-2, 196b-3 and 196b-4 which are serially-coupled from the outer frame 195 to the inner frame 192. Also, each of the piezoelectric cantilevers 196b-1, 196b-2, 196b-3 and 196b-4 are in parallel with the X-axis of the mirror 191. Therefore, the piezoelectric cantilevers 196b-1, 196b-2, 196b-3 and 196b-4 are folded at every cantilever or meandering from the outer frame 195 to the inner frame 192, so that the amplitudes of the piezoelectric cantilevers 196b-1, 196b-2, 196b-3 and 196b-4 can be changed along directions perpendicular to the Y-axis of the mirror 191.

Note that the number of piezoelectric cantilevers in the outer piezoelectric actuator 196a and the number of piezoelectric cantilevers in the outer piezoelectric actuator 196b can be other values such as 2, 6, 8, . . . .

The piezoelectric sensors 197a and 197b serve as speed sensors that sense deflecting angle deviations of the mirror 191 mainly caused by the inner piezoelectric actuators 193a and 193b. The sense voltages $V_{xsa}$ and $V_{xsb}$ of the piezoelectric sensors 197a and 197b are substantially the same as each other, and opposite in phase to each other. These two sense voltages $V_{xsa}$ and $V_{xsb}$ correspond to differentiated signals of the drive voltages $V_{xa}$ and $V_{xb}$. Also, the difference voltage $V_{xs}$ (see: FIG. 1) between the two sense voltages $V_{xsa}$ and $V_{xsb}$ would cancel noises included therein. Therefore, the sense voltage $V_{xs}$ ($=V_{xsa}-V_{xsb}$) of the subtracter 201 of the sense voltage input unit 20 of FIG. 1 is a representative sense deflecting angle signal caused by the inner piezoelectric actuators 193a and 193b. Note that one of the piezoelectric sensors 197a and 197b can be omitted.

The piezoelectric sensors 198a and 198b serve as speed sensors that sense deflecting angle signals of the mirror 191 mainly caused by the outer piezoelectric actuators 196a and 196b. Note that the sense voltages $V_{ysa}$ and $V_{ysb}$ of the piezoelectric sensors 198a and 198b are substantially the same as each other. These sense voltages $V_{ysa}$ and $V_{ysb}$ correspond to a differentiated voltage of the drive voltage $V_{ya}$. Therefore, the sense voltage $V_{ys}$ (=$V_{ysa}$+$V_{ysb}$) of the adder 202 of the sense voltage input unit 20 of FIG. 1 is a representative sense deflecting angle signal caused by the outer piezoelectric actuators 196a and 196b. Note that one of the piezoelectric sensors 198a and 198b can be omitted.

Note that the piezoelectric sensors 197a, 197b, 198a and 198b can be replaced by piezo resistance effect sensors which serve as position sensors of the drive voltages $V_{xa}$, $V_{xb}$, $V_{ya}$ and $V_{yb}$.

The structure of each element of the MEMS optical deflector 19 is explained below.

The mirror 191 is constructed by a monocrystalline silicon support layer serving as a vibration plate and a metal layer serving as a reflector.

The inner frame 192, the torsion bars 194a and 194b and the outer frame 195 are constructed by the monocrystalline silicon support layer and the like.

Each of the piezoelectric actuators 194a and 194b and the piezoelectric cantilevers 196a-1 to 196a-4 and 196b-1 to 196b-4 and the piezoelectric sensors 197a, 197b, 198a and 198b is constructed by a Pt lower electrode layer, a lead zirconate titanate (PZT) layer and a Pt upper electrode layer.

The meander-type piezoelectric actuators 196a and 196b are described below.

In the piezoelectric actuators 196a and 196b, the piezoelectric cantilevers 196a-1, 196a-2, 196a-3, 196a-4, 196b-1, 196b-2, 196b-3 and 196b-4 are divided into an odd-numbered group of the piezoelectric cantilevers 196a-1 and 196a-3; 196b-1 and 196b-3, and an even-numbered group of the piezoelectric cantilevers 196a-2 and 196a-4; 196b-2 and 196b-4 alternating with the odd-numbered group of the piezoelectric cantilevers 196a-1 and 196a-3; 196b-1 and 196b-3.

FIGS. 3A and 3B are perspective views for explaining the operation of the piezoelectric cantilevers of one outer piezoelectric actuator such as 196a of FIG. 2. Note that FIG. 3A illustrates a non-operation state of the piezoelectric cantilevers 196a-1, 196a-2, 196a-3 and 196a-4 of the piezoelectric actuator 196a, and FIG. 3B illustrates an operation state of the piezoelectric cantilevers 196a-1, 196a-2, 196a-3 and 196a-4 of the outer piezoelectric actuator 196a.

For example, as illustrated in FIG. 3B which illustrates only the piezoelectric cantilevers 196a-1, 196a-2, 196a-3 and 196a-4, when the odd-numbered group of the piezoelectric cantilevers 196a-1, 196a-3, 196b-1 and 196b-3 is flexed in one direction, for example, in a downward direction D, the even-numbered group of the piezoelectric cantilevers 196a-2, 196a-4, 196b-2 and 196b-4 is flexed in the other direction, i.e., in an upward direction U. On the other hand, when the odd-numbered group of the piezoelectric cantilevers 196a-1, 196a-3, 196b-1 and 196b-3 is flexed in the upward direction U, the even-numbered group of the piezoelectric cantilevers 196a-2, 196a-4, 196b-2 and 196b-4 is flexed in the downward direction D.

Thus, the mirror 191 is rocked with respect to the Y-axis.

First, a main scanning operation or horizontal scanning operation by rocking the mirror 191 with respect to the X-axis is explained in detail with reference to FIGS. 4A, 4B and 4C.

Figure 4A:
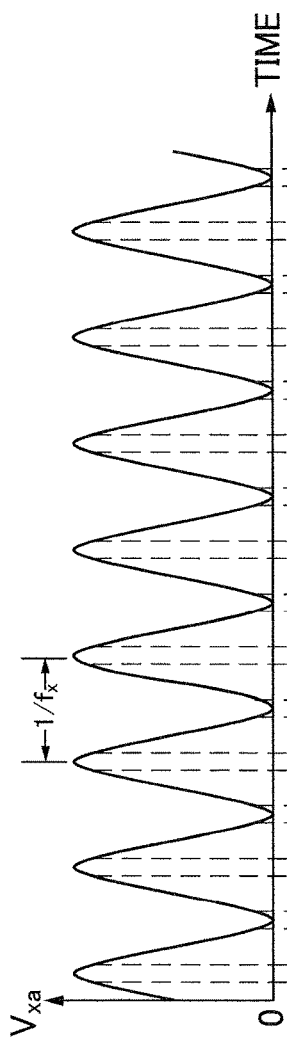
FIGS. 4A, 4B and 4C are timing diagrams for explaining the horizontal operation of the MEMS optical deflector of FIG. 1.
Figure 4B:
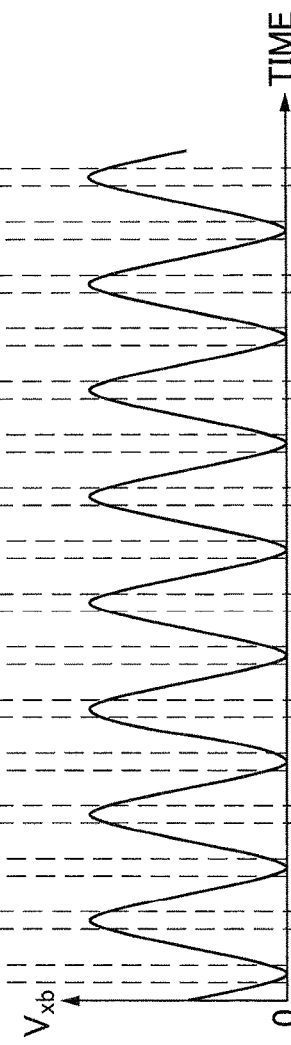
Figure 4C:
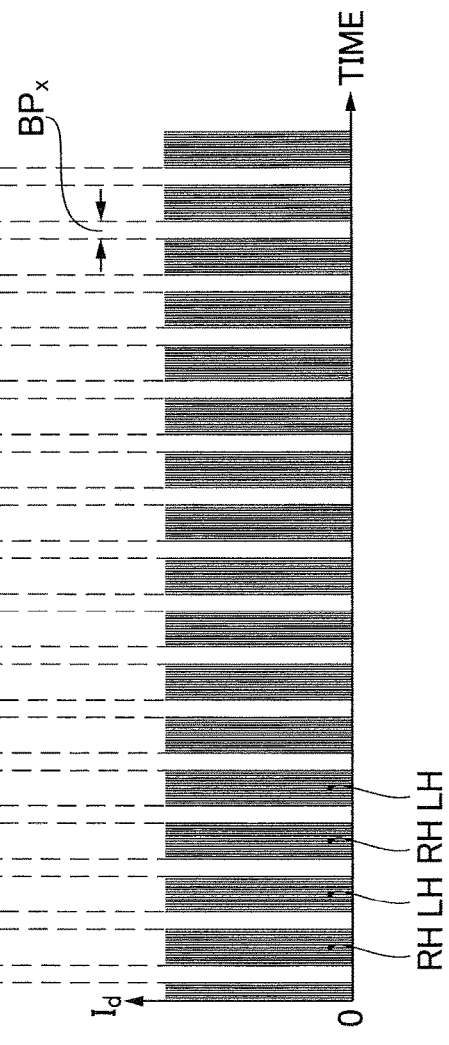

As illustrated in FIGS. 4A and 4B, the drive voltage $V_{xa}$ and the drive voltage $V_{xb}$ generated from the drive unit 18 are sinusoidal at a relatively high resonant frequency $f_x$ and symmetrical or opposite in phase to each other. As a result, the inner piezoelectric actuators 193a and 193b carry out flexing operations in opposite directions to each other, so that the torsion bars 194a and 194b are twisted to rock the mirror 191 with respect to the X-axis. In this case, the changing rates of the drive voltages $V_{xa}$ and $V_{xb}$ are low at their lowest and highest levels as illustrated in FIGS. 4A and 4B, so that the brightness thereof at the fixed screen 2 would be particularly high. Therefore, as illustrated in FIG. 4C, horizontal blanking periods $BP_X$ for turning off the laser light source 22 are provided where the changing rates of the drive voltages $V_{xa}$ and $V_{xb}$ are low to make the brightness at the entire screen 2 uniform. Additionally, right-direction horizontal scanning periods RH alternating with left-direction horizontal scanning periods LH are provided between the horizontal blanking periods $BP_x$, in order to increase the depicting time period, and thus the depicting efficiency can be enhanced.

Next, a sub scanning operation or vertical scanning operation by rocking the mirror 191 with respect to the Y-axis is explained in detail with reference to FIGS. 5A, 5B and 5C.

As illustrated in FIGS. 5A and 5B, the drive voltage $V_{ya}$ and the drive voltage $V_{yb}$ are saw-tooth-shaped at a relatively low non-resonant frequency $f_Y$ and symmetrical or opposite in phase to each other. As a result, the piezoelectric cantilevers 196a-1, 196a-3, 196b-1 and 196b-3 and the piezoelectric cantilevers 196a-2, 196a-4, 196b-2 and 196b-4 carry out flexing operations in opposite directions to each other, so that the mirror 191 is rocked with respect to the Y-axis. In this case, the changing rates of the drive voltages $V_{ya}$ and $V_{yb}$ are low at their lowest and highest levels as illustrated in FIGS. 5A and 5B, so that the brightness thereof at the fixed screen 2 would be particularly high. Therefore, as illustrated in FIG. 5C, vertical blanking periods $BP_Y$ for turning off the laser light source 22 are provided where the changing rates of the drive voltages $V_{ya}$ and $V_{yb}$ are low to make the brightness at the entire screen 2 uniform.

As illustrated in FIG. 6, which is a diagram showing a relationship between a scanning locus SL1 and a projected view field F1 of the laser beam L1 on the fixed screen 2 of FIG. 1, a horizontal scanning line H and a vertical scanning line V by the light beam L1 are protruded from the projected view field F1 defined by a horizontal angle of 40°, for example, and a vertical angle of 25°, for example.

Figure 7A:
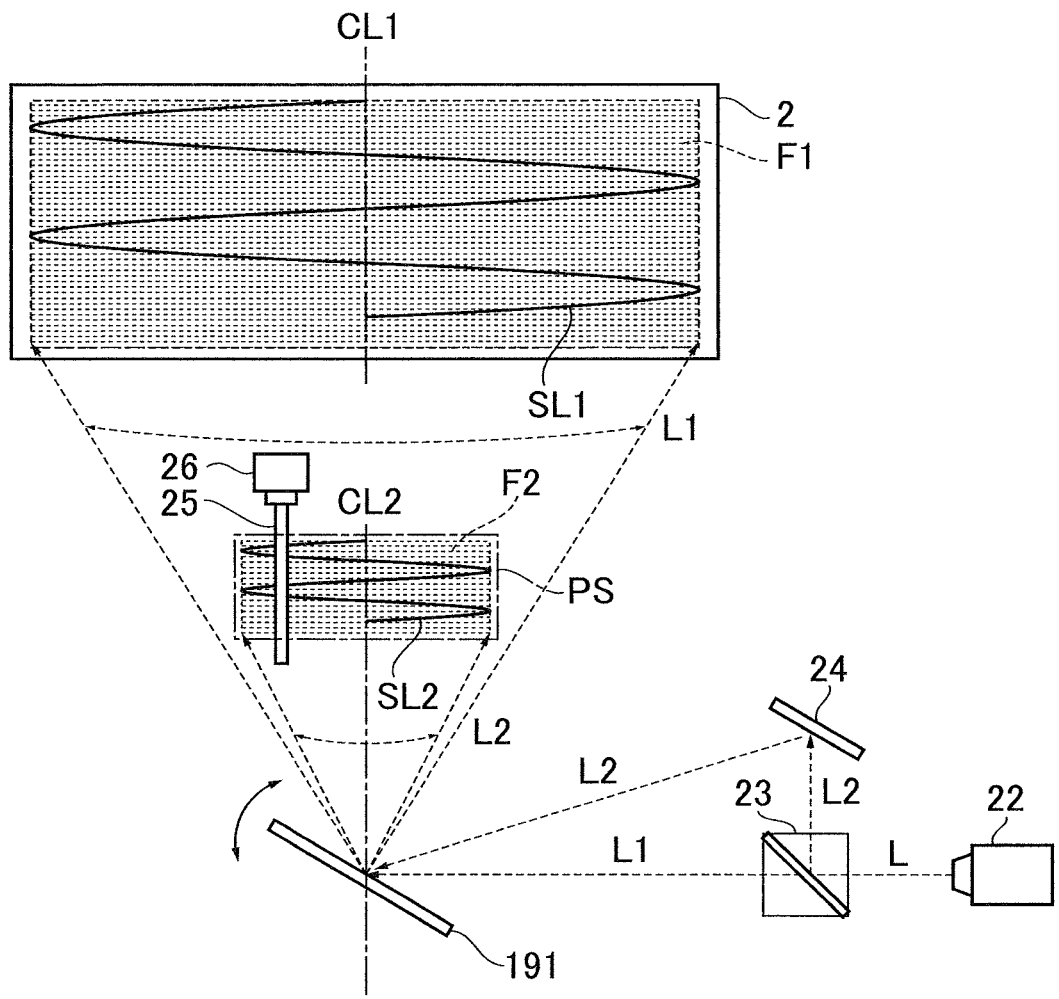
FIG. 7A is a detailed diagram showing a relationship between the projected view field on the fixed screen and the projected rocking angle measuring view field on the provisional screen of FIG. 1.

In FIG. 7A, which is a detailed diagram showing a relationship between the projected view field F1 on the fixed screen 2 and the rocking angle measuring view field F2 on the provisional screen PS of FIG. 1, a scanning locus SL1 of the projected view field F1 with a center line CL1 on the fixed screen 2 by the light beam L1 is synchronized with a scanning locus SL2 of the rocking angle measuring view field F2 with a center line CL2 on the provisional screen PS. Also, the optical guide unit 25 is located along the vertical direction within the rocking angle measuring view field F2 shifted from the center line CL2 thereof. Therefore, the optical guide unit 25 receives the laser beam L2 twice for one horizontal scanning operation regardless of the vertical scanning operation.

Note that the position of the optical guide unit 25 is within the maximum horizontal range of the rocking angle measuring view field F2.

Figure 7B:
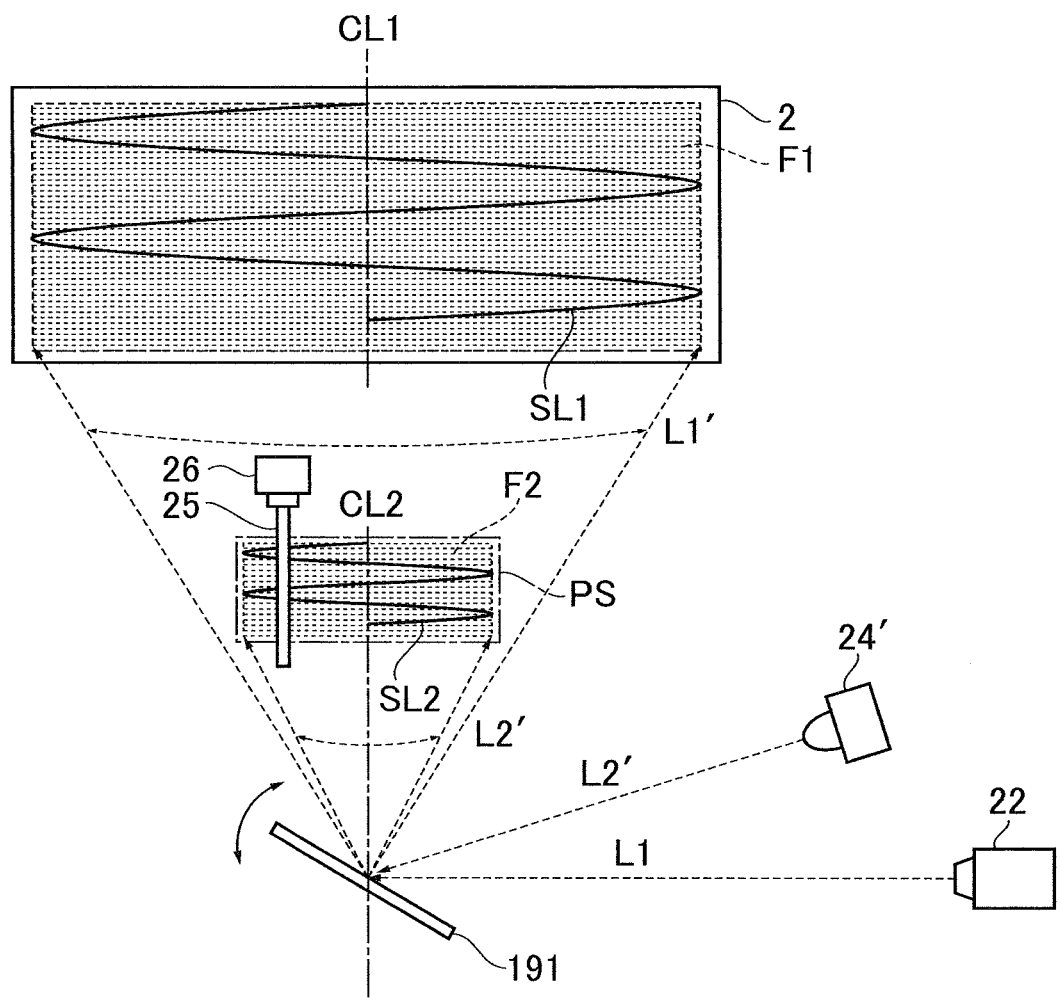
FIG. 7B is a diagram of a modification of FIG. 7A.

In FIG. 7B, which is diagram of a modification of FIG. 7A, the fixed mirror 24 is replaced by a light source 24' which generates a light beam L2' similar to the light beam L2. In this case, the light beam L2' should be enclosed within the video projection apparatus 1, so that the light beam L2' generates no stray light beam outside. The light beam L2' is preferably invisible, for example, infrared. As a result, the light beam L2' never interferes with the light beam L1.

Next, the calculating operation of the resonant frequency $f_r$ of the main scanning operation is explained next with reference to FIGS. 8, 9A, 9B, 10A and 10B.

Since the piezoelectric sensor 197a serves as a speed sensor as stated before, the sinusoidal-wave drive voltage $V_{xa}$ will be converted by the piezoelectric sensor 197a into a sinusoidal-wave sense voltage whose phase is delayed by 90° as compared with a phase of the sinusoidal-wave drive signal $V_{xa}$. In other words, if the drive voltage $V_{xa}$ is sine-waved, the sense voltage $V_{xs}$ is cosine-waved.

In FIG. 8, which is a detailed block diagram of the drive signal processing section 16 of FIG. 1 for processing the sense voltage $V_{xs}$, convolution calculating sub sections 161 and 162 and an orthogonal coordinate-to-polar coordinate converting sub section 163 are provided.

Note that the elements other than the convolution calculating sub sections 161 and 162 and the orthogonal coordinate-to-polar coordinate converting sub section 163 are omitted from FIG. 8, in order to simplify the description.

In FIG. 8, the drive voltage $V_{xa}(t_i)$ is represented by $$V_{xa}(t_i) = A \cdot \sin(2\pi f_x \cdot t_i)$$

where A is an amplitude;
$f_x$ is a frequency; and
$t_i$ is a timing point.
Also, a voltage $V_{xa}'(t_i)$ is represented by $$V_{xa}'(t_i) = A \cdot \cos(2\pi f_x \cdot t_i)$$

That is, the drive voltage $V_{xa}(t_i)$ and the voltage $V_{xa}'(t_i)$ are both sinusoidal-wave voltages with a phase difference of 90° therebetween.

Further, a sense voltage $V_{xs}(t_i)$ is represented by $$V_{xs}(t_i) = B \cdot \cos(2\pi f_x \cdot t_i - \theta) = B \cdot \cos(\theta - 2\pi f_x \cdot t_i)$$

where B is an amplitude, and
$\theta$ is a phase difference.

The convolution calculating sub section 161 calculates a convolution $X = (V_{xa} * V_{xs})(\theta)$ between the drive voltage $V_{xa}$ and the sense voltage $V_{xs}(t_i)$ by $$X = \Sigma AB \cdot \sin(2\pi f_x \cdot t_i) \cdot \cos(\theta - 2\pi f_x \cdot t_i)$$

The convolution calculating sub section 162 calculates a convolution $Y = (V_{xa}' * V_{xs})(\theta)$ between the voltage $V_{xa}'$ and the sense voltage $V_{xs}(t_i)$ by $$Y = \Sigma AB \cdot \cos(2\pi f_x \cdot t_i) \cdot \cos(\theta - 2\pi f_x \cdot t_i)$$

In the convolution calculating sub sections 161 and 162, there are 1000 or more timing points $t_i$ within one period $1/f_x$ to suppress the noise.

The convolutions X and Y form an X-coordinate value and a Y-coordinate value of an orthogonal coordinate.

The orthogonal coordinate-to-polar coordinate converting sub section 163 converts the orthogonal coordinate (X, Y) calculated by the calculating sub sections 161 and 162 into a polar coordinate $(R(f_x), \theta(f_x))$ by $$R(f_x) = (X^2 + Y^2)$$

$$\theta(f_x) = \tan^{-1}(X/Y)$$

where $R(f_x)$ is a radius component showing the intensity (amplitude) of the sense voltage $V_{xs}$, i.e., the maximum rocking angle of the mirror 191; and
$\theta(f_x)$ is an angle component showing the phase difference between the drive voltage $V_{xa}$ and the sense voltage $V_{xs}$ determined by a delay time by the operation of the mirror 191, a delay of transmission of signals through connections and the like.

Figure 9A:
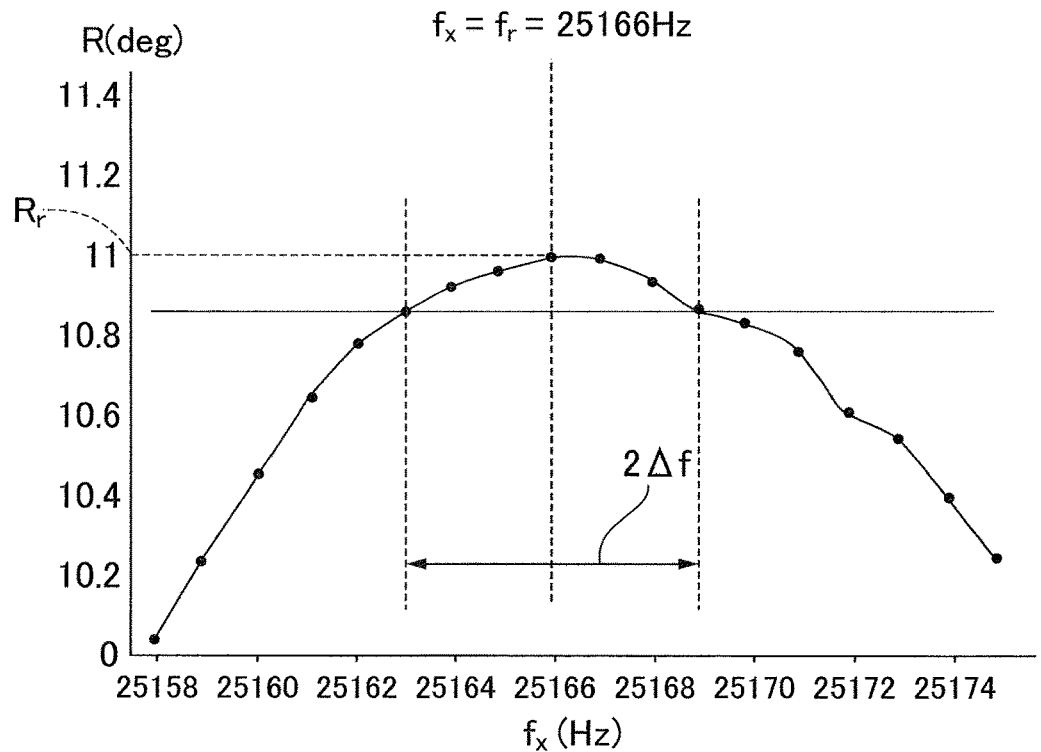
FIG. 9A is a graph illustrating a relationship between the frequency $f_x$ and the radius component R of the polar coordinate (R, θ) of FIG. 8.
Figure 9B:
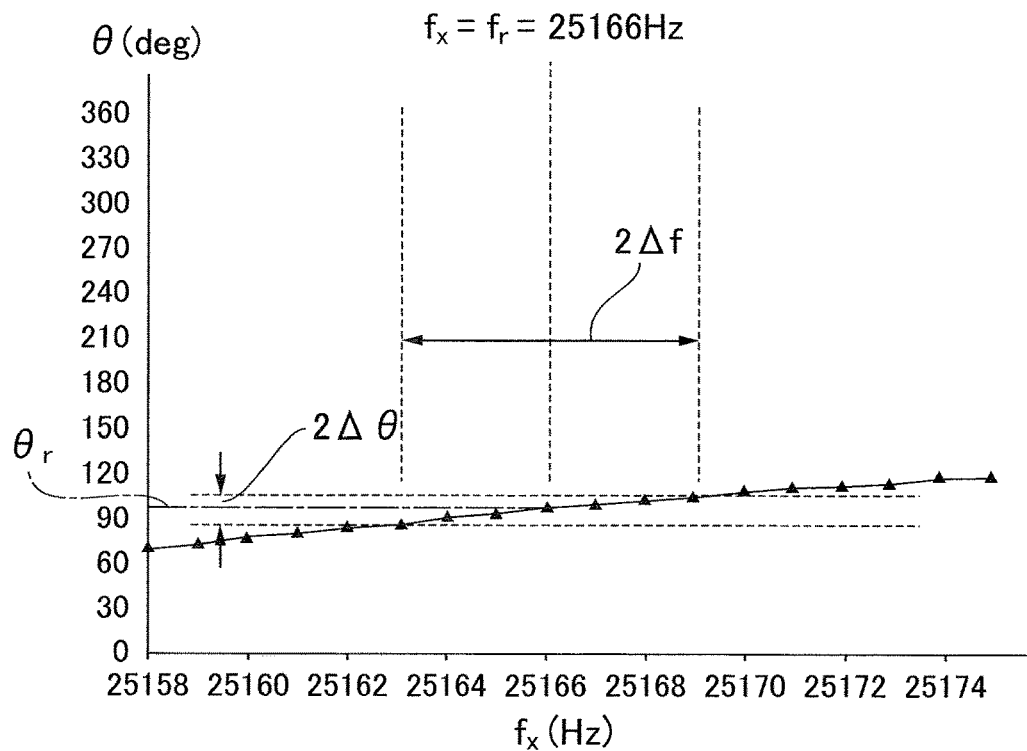
FIG. 9B is a graph illustrating a relationship between the frequency $f_x$ and the angle component θ of the polar coordinate (R, θ) of FIG. 8.

The drive signal generating section 15 sweeps the frequency $f_x$ of the drive voltage $V_{xa}$ to drive the MEMS optical deflector 19 to obtain a radius component $R(f_x)$ as shown in FIG. 9A and an angle component $\theta(f_x)$ as shown in FIG. 9B from the drive signal processing section 16. In FIG. 9A, the radius component R is represented by a flexing angle (deg) of the mirror 191.

As illustrated in FIG. 9A, when the radius component R is maximum, i.e., $R = R_r = 11°$, the frequency $f_x$ is a resonant frequency $f_r$, in this case, 25166 Hz. If the allowance range of the radius component R is within one percent of the maximum radius component $R_r$, $\Delta f = 3$ Hz, the allowance range of the resonant frequency is from $f_r - \Delta f$ (=25163 Hz) to $f_r + \Delta f$ (=25169 Hz).

As illustrated in FIG. 9B, the angle component $\theta$ is $\theta_r = 100°$ at the resonant frequency $f_x = f_r$. Also, the allowance $\Delta\theta$ of the angle component $\theta$ is 5° corresponding to $\Delta f = 3$ Hz.

Figure 10A:
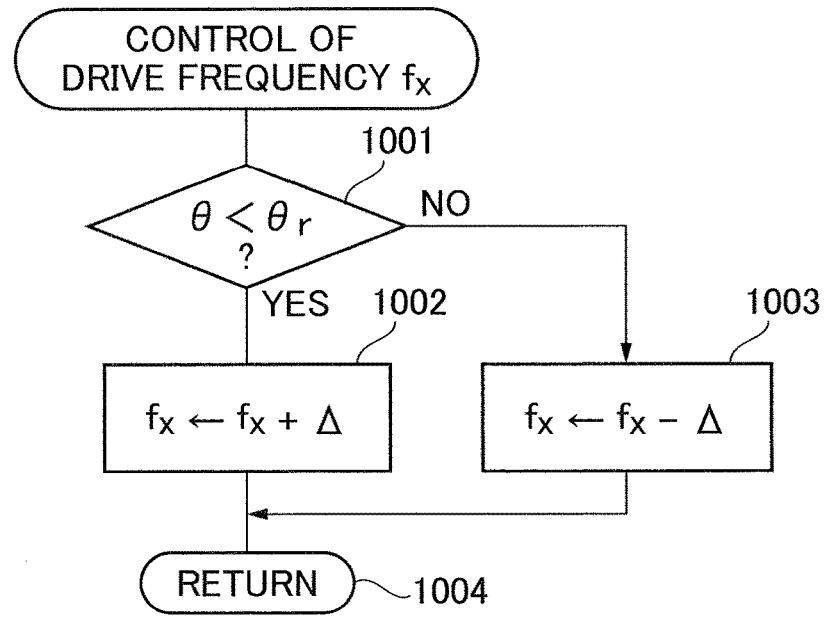
FIGS. 10A and 10B are flowcharts for explaining the operation of the drive signal generating section of FIG. 1.
Figure 10B:
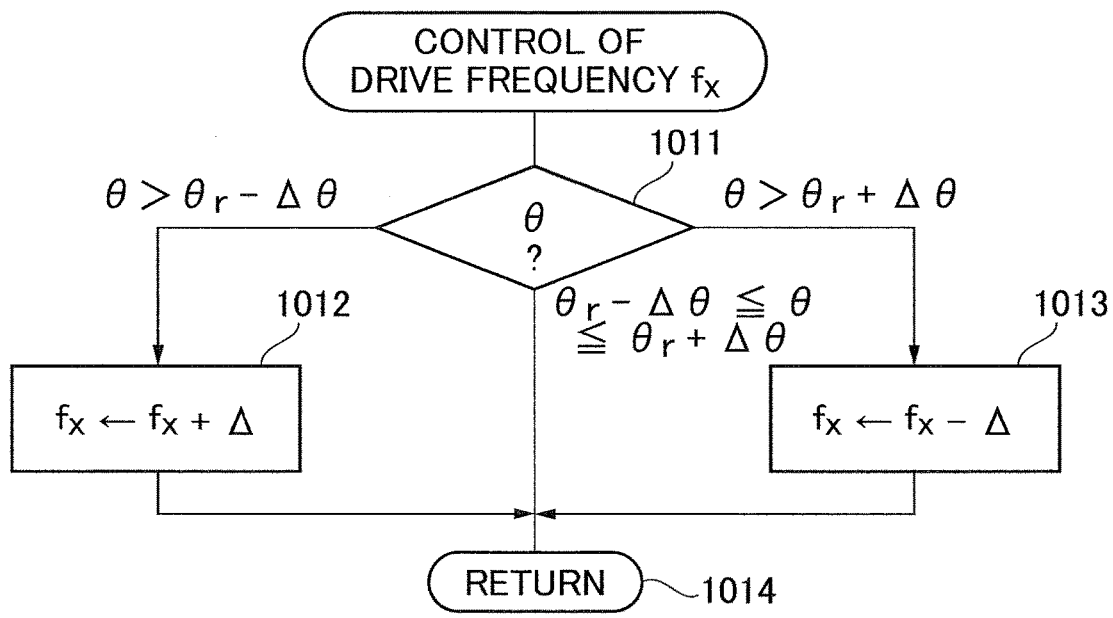

As illustrated in FIG. 9B, the angle component (phase difference) $\theta$ has a linear relationship with the drive frequency $f_x$. Therefore, the control of the frequency $f_x$ of the drive voltage $V_{xa}$ can be carried out by monitoring the angle component $\theta$ as illustrated in FIG. 10A or 10B. Note that the flowchart of FIG. 10A or 10B are carried out by the drive signal generating section 15 at every predetermined time period such as 40 μsec.

At step 1001 of FIG. 10A, it is determined whether or not $\theta < \theta_r$ is satisfied. As a result, when $\theta < \theta_r$, the control proceeds to step 1002 which increases the angle component $\theta$ by $\Delta$ (positive value). On the other hand, when $\theta \geq \theta_r$, the control proceeds step 1003 which decreases the angle component $\theta$ by $\Delta$. Then, the control proceeds to step 1004. Thus, the angle component $\theta$ is brought close to $\theta_r$, thus maintaining the projected view field F1, even if the frequency $f_x$ is deviated from the resonant frequency $f_r$.

Similarly, at step 1011 of FIG. 10B, it is determined whether $\theta$ satisfies $\theta > \theta_r - \Delta\theta$, $\theta_r - \Delta\theta \leq \theta \leq \theta_r + \Delta\theta$ or $\theta > \theta_r + \Delta\theta$. As a result, when $\theta < \theta_r - \Delta\theta$, the control proceeds to step 1012 which increases the angle component $\theta$ by $\Delta$, while, when $\theta \geq \theta_r + \Delta\theta$, the control proceeds step 1013 which decreases the angle component $\theta$ by $\Delta$. Then, the control proceeds to step 1014. On the other hand, when $\theta_r - \Delta\theta \leq \theta \leq \theta_r + \Delta\theta$, the control proceeds directly to step 1014. Thus, the angle component $\theta$ is brought close to $\theta_r$, thus maintaining the projected view field F1, even if the frequency $f_x$ is deviated from the allowable range $(f_r - \Delta f \sim f_r + \Delta f)$ of the resonant frequency $f_r$. In this case, since no change is performed upon the angle component $\theta$ when $\theta_r - \Delta\theta \leq \theta \leq \theta_r + \Delta\theta$, chattering due to the noise can be prevented.

The above-calculated horizontal resonant frequency $f_r$ is stored in a register or the like, which will be used for calculating the amplitude A of the drive voltages $V_{xa}$ and $V_{xb}$.

The operation of the drive voltages $V_{xa}$ and $V_{xb}$ is carried out by the drive signal generating section 15, so that a product value P between a time period T from a predetermined timing point when the sense voltage $V_{xs}$ to a timing point when the optical guide unit 25 has generated its output voltage $V_{pd}$ and the horizontal resonant frequency $f_r$ of the MEMS optical deflector 19 is brought close to a predetermined value P0 determined by a desired maximum rocking angle $\phi_d$. This will be explained with reference to FIGS. 11, 12A, 12B, 12C, 13A and 13B.

Figure 11:
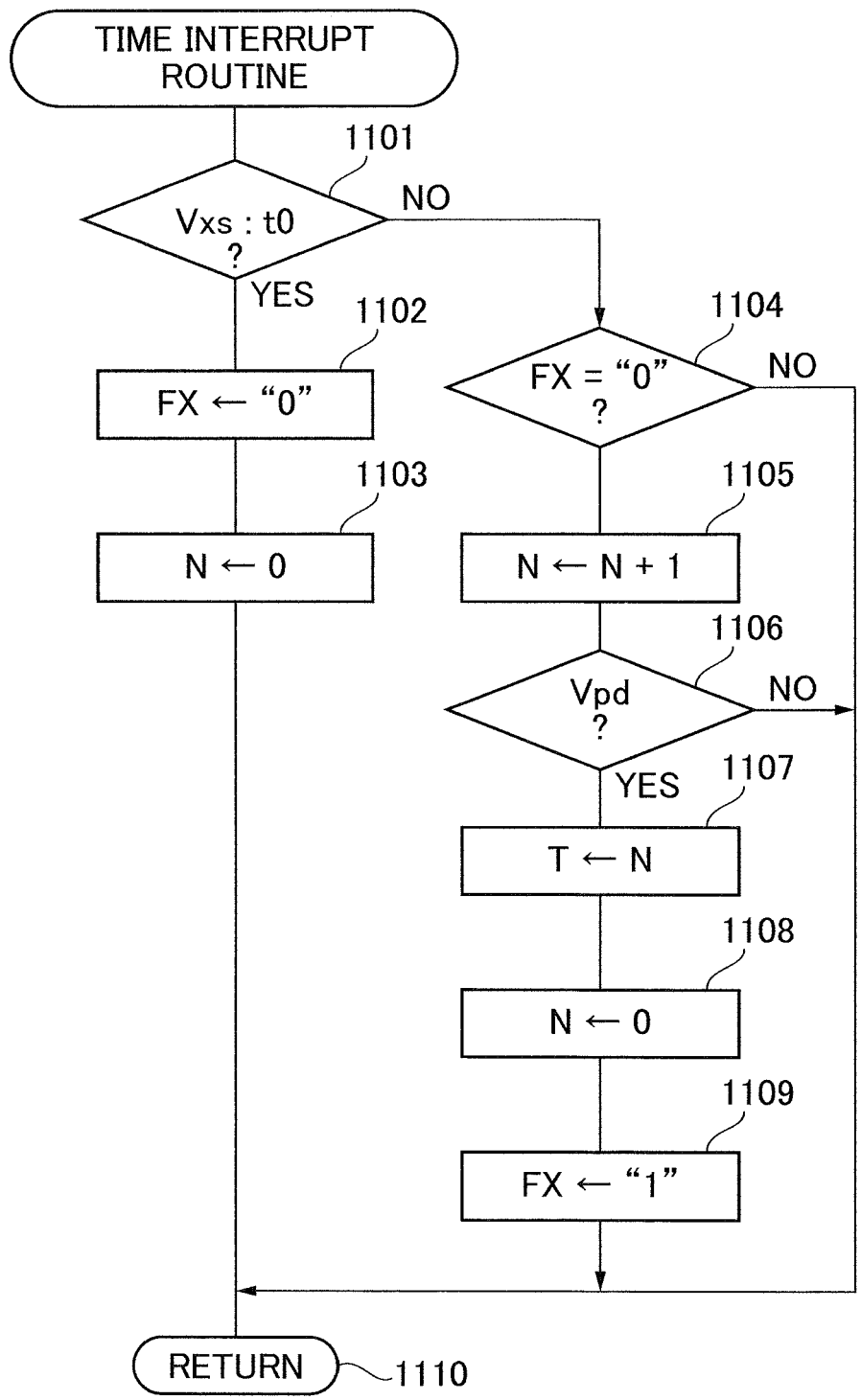
FIG. 11 is a flowchart for explaining the operation of the drive signal processing section of FIG. 1.

FIG. 11 is a time interrupt routine carried out at regular intervals such as 1 μsec by the drive signal processing section 16 to calculate the above-mentioned time period T.

Figure 12A:
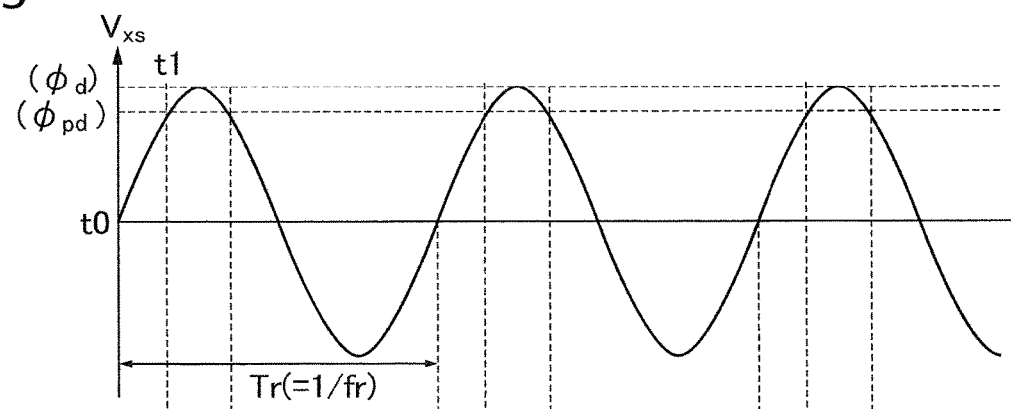
FIGS. 12A, 12B and 12C are timing diagrams for explaining the flowchart of FIG. 11.
Figure 12B:
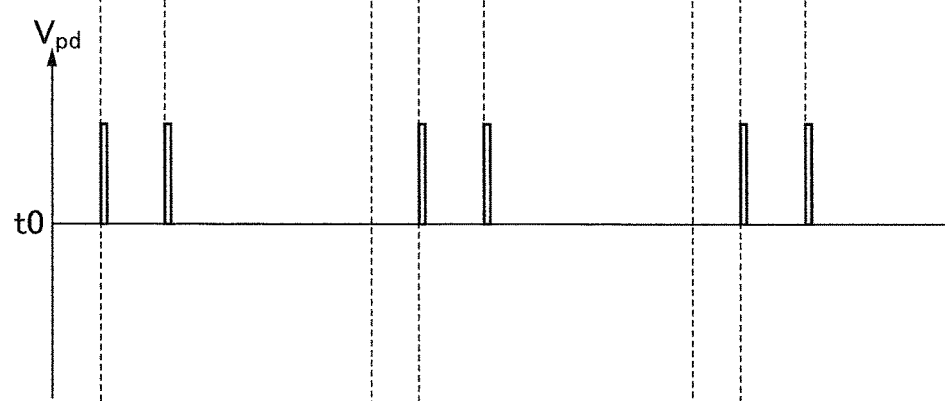

First, at step 1101, it is determined whether or not a sense voltage $V_{xs}$ as shown in FIG. 12A is an origin timing (first timing) point t0. Here, assume that the sense voltage $V_{xs}$ is a position signal of the drive voltage $V_{xa}$, and the drive voltage $V_{xa}$ is changed at the resonant frequency $f_r$ (=1/$T_r$). Also, in FIG. 12A, $\phi_d$ is a desired maximum rocking angle, and $\phi_{pd}$ is a rocking angle at the optical guide unit 25. In this case, note that $V_{xs}$=0 and $dV_{xs}/dt>0$ at the origin timing point t0; however, if the sense voltage $V_{xs}$ is a speed signal of the drive voltage $V_{xa}$, $V_{xs}$>0 and $dV_{xs}/dt$=0 at the origin timing point t0. If the sense voltage $V_{xs}$ is at the origin timing point t0, the control proceeds to steps 1102 and 1103 which resets a flag FX (FX="0") and clears a counter value N (see FIG. 12C). Otherwise, the control proceeds to steps 1104 to 1108.

At step 1104, it is determined whether or not the flag FX is "0". If FX="0", the control proceeds to step 1105. Otherwise, the control proceeds directly to step 1109.

At step 1105, the counter value N is counted up by +1, and then, at step 1106, it is determined whether or not the photo signal receiving section 27 generates its photo detection voltage $V_{pd}$. If the photo signal receiving section 27 generates its photo detection voltage $V_{pd}$ at timing (second timing) point t1, the control proceeds to steps 1106, 1107 and 1108. Otherwise, the control proceeds directly to step 1109.

At step 1106, a time period T is calculated by $$T \leftarrow N.$$

Figure 12C:
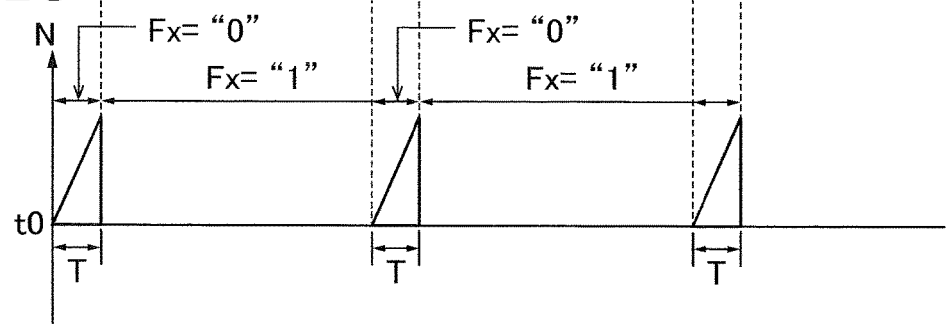

Then, at step 1107, the counter value N is cleared and, at step 1108, the flag FX is set (FX="1") (see: FIG. 12C). Then, the control proceeds to step 1109.

Thus, the time period T from the first timing point t0 to the second timing point t1 is calculated.

FIG. 13A is a time interrupt routine carried out at regular intervals such as 40 μsec by the drive signal processing section 16 of FIG. 1 to control the amplitude A of the drive voltages $V_{xa}$ and $V_{xb}$.

First, at step 1301, a predetermined value P0 is calculated in accordance with a desired maximum rocking angle $\phi_d$ of the mirror 191 by $$S0 = \alpha/\theta_d$$

where α is a positive definite value.

Next, at step 1302, a product value P is calculated by $$P \leftarrow T \cdot f_r$$

where T is the time period from the origin timing (first timing) point t0 to the photo detection timing point (second timing) t1 of the optical guide unit 25;
$f_r$ is the calculated resonant frequency by the drive signal processing section 16.

Next, at step 1303, it is determined whether or not P<P0 is satisfied. As a result, when P<P0, the control proceeds to step 1304 which decreases the amplitude A by ΔA (positive value). On the other hand, when P≥P0, the control proceeds to step 1305 which increases the amplitude A by ΔA.

Next, at step 1306, the amplitude A is transmitted to the drive signal generating section 15, thus completing this routine at step 1307.

Thus, the product value P is brought close to the predetermined value P0 depending upon the desired maximum rocking angle $\phi_d$.

In FIG. 13B, which is a modification of FIG. 13A, steps 1303 to 1305 of FIG. 13A are replaced by steps 1311 to 1313.

That is, at step 1311, it is determined whether P<P0−ΔP (positive value), P0−ΔP≤P≤P0+ΔP or P>P0+ΔP. As a result, when P<P0−ΔP, the control proceeds to step 1312 which decreases the amplitude A by ΔA, while, when P>P0+ΔP, the control proceeds to step 1313 which increases the amplitude A by ΔA. On the other hand, when P0−ΔP≤P≤P0+ΔP, the control proceeds directly to step 1306.

Thus, the product value P is brought close to the predetermined value P0 depending upon the desired maximum rocking angle $\phi_d$, even if the product value P is deviated from the allowable range (P0−ΔP~P0+ΔP). In this case, since no change is performed upon the product value P when P0−ΔP≤P≤P0+ΔP, chattering due to the noise can be prevented.

The effect of the video projection apparatus 1 of FIG. 1 will be explained with reference to FIGS. 14A, 14B and 14C.

Figure 14A:
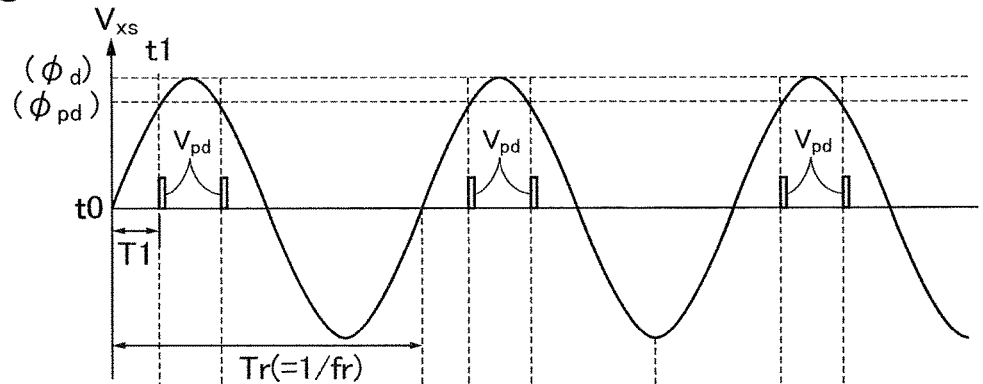
FIGS. 14A, 14B and 14C are timing diagrams for explaining the effect of the video projection apparatus of FIG. 1.

In FIG. 14A, which shows an ideal state where the sense voltage $V_{xs}$ (the rocking angle ϕ) of the mirror 191, the sense voltage $V_{xs}$ (the rocking angle ϕ) varies at a resonant frequency $f_r$ (=1/$T_r$), the photo signal receiving section 27 generates its output voltage $V_{pd}$ at time t1 (ϕ=$\phi_{pd}$), so that the maximum sense voltage $V_{xs}$, i.e., the maximum rocking angle ϕ is a desired maximum rocking angle $\phi_d$. In this case, the time period T is represented by $$T = T1$$

Also, the product value P0 is represented by $$P0 = T1 \cdot f_r$$

Figure 14B:
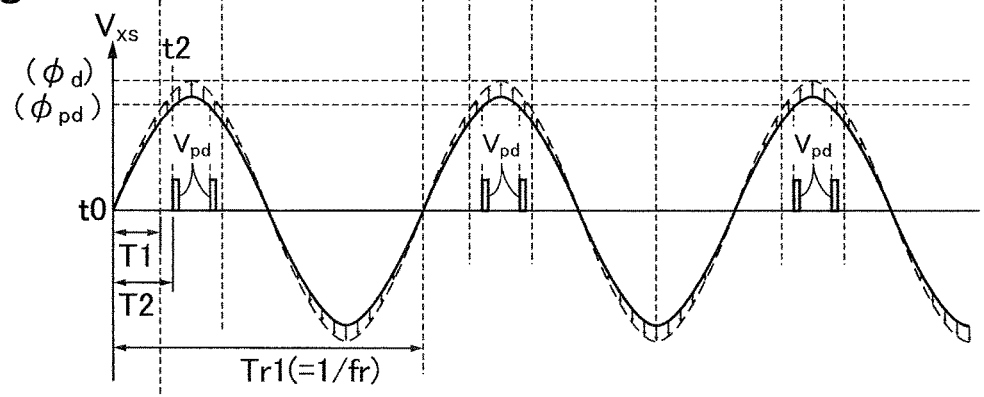

In FIG. 14B, which shows a drive voltage deviation state where the drive voltage $V_{xa}$, i.e., the sense voltage $V_{xs}$ is deviated to the lower side, the photo signal receiving section 27 generates its output voltage $V_{pd}$ at time t2 later than time t1, and also, the maximum sense voltage $V_{xs}$, i.e., the maximum rocking angle ϕ is smaller than the desired rocking angle $\phi_d$. In this case, the time period T is represented by $$T = T2 > T1$$

Also, the product value P is represented by $$P = T2 \cdot f_r > T1 \cdot f_r = P0$$

In the above-mentioned drive voltage deviation state, the amplitude A of the drive voltage $V_{xa}$ ($V_{xb}$) is controlled to be increased, so that the product value P is brought close to the product value P0, i.e., the time period T2 is brought close to the time period T1. Thus, the maximum rocking angle ϕ is brought close to the desired rocking angle $\phi_d$.

Figure 14C:
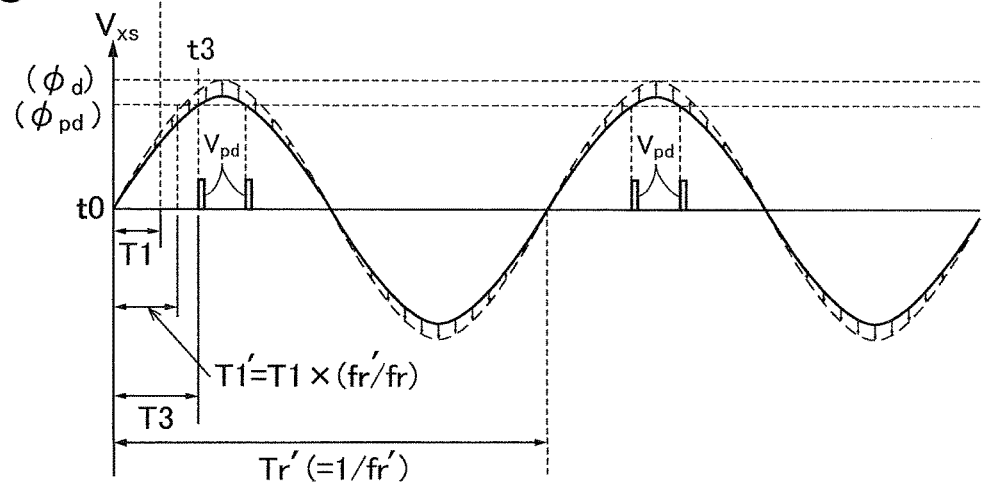

In FIG. 14C, which shows a resonant frequency deviation state where the resonant frequency is deviated to $f_r'$ (=1/$T_r'$) smaller than $f_r$ (=1/$T_r$), the photo signal receiving section 27 generates its output voltage $V_{pd}$ at time t3 later than time t1, and the maximum sense voltage $V_{xs}$, i.e., the maximum rocking angle ϕ is smaller than the desired rocking angle $\phi_d$. In this case, the time period T is represented by $$T = T3 > T1$$

Also, the product value P is represented by $$P = T3 \cdot f_r' > T1 \cdot (f_r'/f_r) \cdot f_r$$

In the above-mentioned resonant frequency deviation state, the amplitude A of the drive voltage $V_{xa}$ ($V_{xb}$) is controlled to be increased, so that the product value P is brought close to the product value P0·($f_r'/f_r$), i.e., the time period T3 is brought close to a time period T1'=T1·($f_r'/f_r$). Thus, the maximum rocking angle is brought close to the desired maximum rocking angle $\phi_d$.

Generally, a drive voltage deviation and resonant frequency deviation state, the amplitude A of the drive voltage $V_{xa}$ ($V_{xb}$) is controlled to be changed, so that the product value P is brought close to the product value P0. As a result, the maximum rocking angle φ is brought close to the desired maximum rocking angle $\phi_d$.

Figure 15:
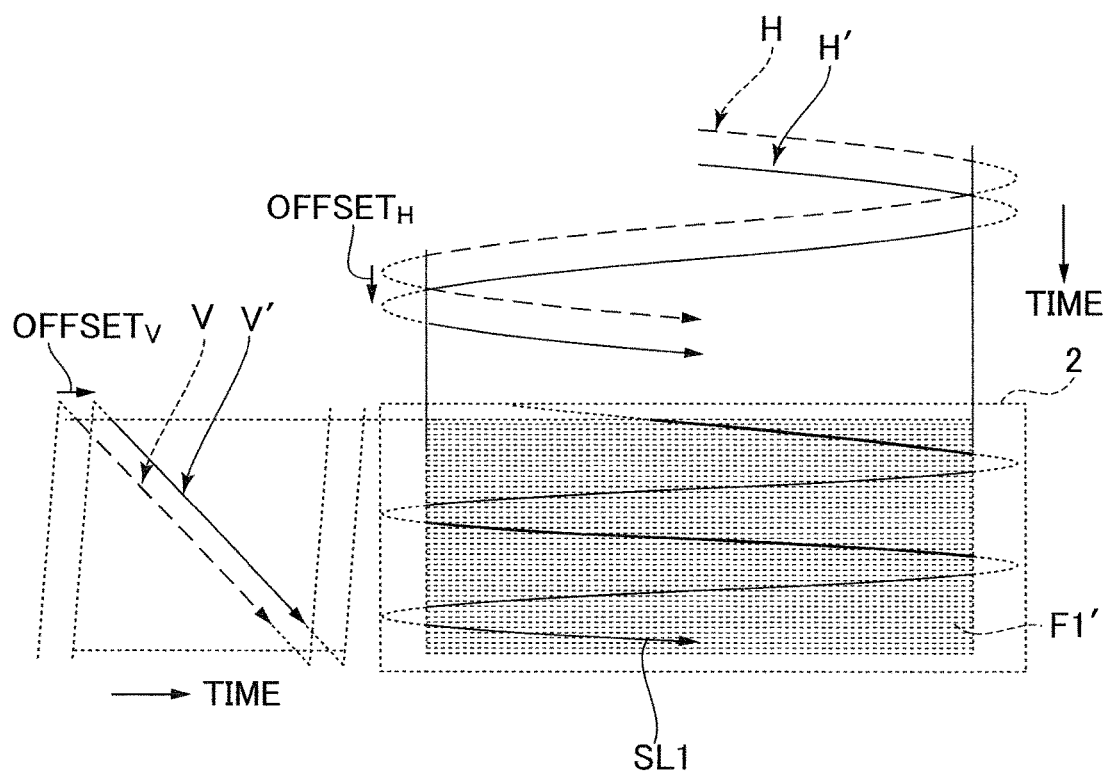
FIG. 15 is a detailed diagram showing another relationship between a scanning locus and a projected view field of the laser beam on the fixed screen of FIG. 1.
Figure 16A:
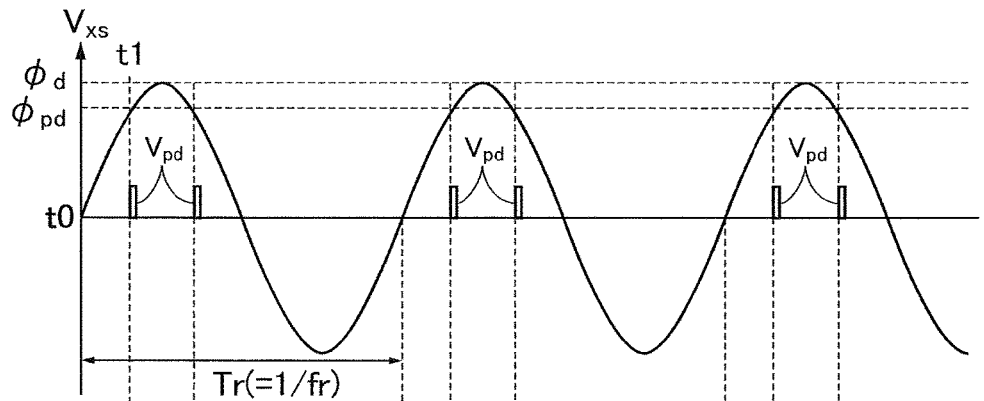
FIGS. 16A, 16B and 16C are timing diagrams for explaining the effect of the prior art.
Figure 16B:
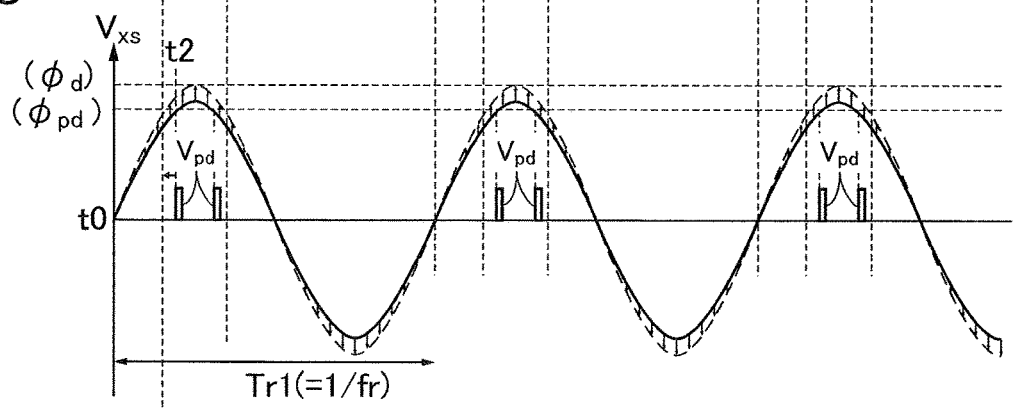
Figure 16C:
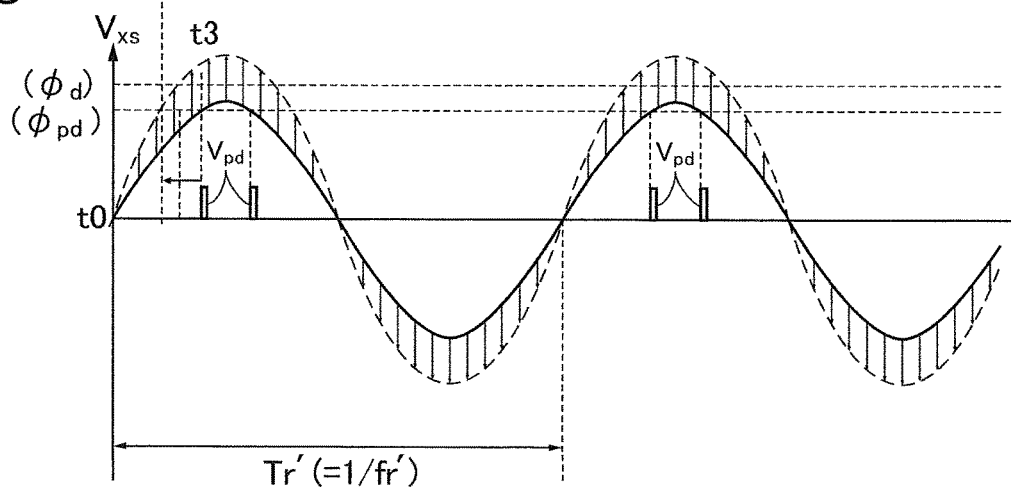

As illustrated in FIG. 15, which illustrates another relationship between a scanning locus SL1' and a projected view field F1' of the laser beam L1 on the fixed screen 2 of FIG. 1, since the drive voltages $V_{xa}$ and $V_{xb}$ are delayed by the mechanical operation of the MEMS optical deflector 19 and the like, the drive signal processing section 16 copies the horizontal scanning line H and the vertical scanning line V of the drive voltages $V_{xa}$ and $V_{ya}$ from the drive signal generating section 15 and delays the horizontal scanning line H and the vertical scanning line V by offsets OFFSET, and OFFSET, to generate horizontal scanning line H' and vertical scanning line V'. Thus, the light source drive unit 21 is driven by the horizontal scanning line H' and the vertical scanning line V'. As a result, a view field F1' can be surely projected on the fixed screen 2. Also, since the drive system for the drive unit 18 and the MEMS optical deflector 19 is separated from the drive system for the pixel data extracting section 17, the light source drive unit 21 and the laser light source 22, the electromagnetic interference (EMI) noises therebetween can be suppressed.

In FIG. 2, note that the inner piezoelectric actuators 193a and 193b and the torsion bars 194a and 194b can be replaced by meander-type piezoelectric actuators.

In the above-described embodiment, note that the product value P ($=T \cdot f_r$) is equivalent to a ratio value R ($=T/T_r$), since the resonant frequency $f_r$ is equal to $1/T_r$ where $T_r$ is a period of the resonant frequency $f_r$.

In the above-described embodiment, the MEMS optical deflector 19 can be a MEMS electromagnetic optical deflector or a MEMS electrostatic optical deflector.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A video projection apparatus comprising:
   an optical deflector having a mirror for reflecting a first light beam to project a first view field and reflecting a second light beam different from said first light beam to project a second view field which is not superposed onto said first view field, an actuator for rocking said mirror with an axis of said mirror and a sensor provided in the vicinity of said actuator;
   an optical guide unit provided within said second view field and located along a direction shifted from a center line of said second view field;
   a photodetector coupled to said optical guide unit; and
   a control unit adapted to apply a first sinusoidal-wave voltage to said actuator,
   said control unit being further adapted to:
   calculate a resonant frequency of said first sinusoidal-wave voltage;
   detect a first timing point from a sense voltage of said sensor;
   detect a second timing point from a photo detection voltage of said photodetector when said second light beam is incident to said optical guide unit;
   calculate a time period from said first timing point to said second timing point;
   calculate a product value between said time period and said resonant frequency; and
   control an amplitude of said first sinusoidal-wave voltage so that said product value is brought close to a predetermined value.

2. The video projection apparatus as set forth in claim 1, further comprising:
   a light source adapted to generate a main light beam;
   a beam splitter adapted to split said main light beam into said first and second light beams, said first light beam being incident directly to said mirror; and
   a fixed mirror adapted to reflect said second light beam to said mirror.

3. The video projection apparatus as set forth in claim 1, further comprising:
   a first light source adapted to generate said first light beam; and
   a second light source adapted to generate said second light beam.

4. The video projection apparatus as set forth in claim 3, wherein said second light beam is invisible.

5. The video projection apparatus as set forth in claim 1, wherein the sense voltage of said sensor is a position signal of said first sinusoidal-wave voltage, said first timing point being defined by $V_{xs}=0$ and $dV_{xs}/dt>0$ where $V_{xs}$ is the sense voltage of said sensor.

6. The video projection apparatus as set forth in claim 1, wherein the sense voltage of said sensor is a speed signal of said first sinusoidal-wave voltage, said first timing point being defined by $V_{xs}>0$ and $dV_{xs}/dt=0$ where $V_{xs}$ is the sense voltage of said sensor.

7. The video projection apparatus as set forth in claim 1, wherein said control unit is further adapted to:
   determine whether or not said product value is smaller than said predetermined value;
   decrease the amplitude of said sinusoidal-wave voltage when it is determined that said product value is smaller than said predetermined value; and
   increase the amplitude of said sinusoidal-wave voltage when it is determined that said product value is not smaller than said predetermined value.

8. The video projection apparatus as set forth in claim 1, wherein said control unit is further adapted to:
   determine whether or not said product value is smaller than a first threshold value smaller than said predetermined value;
   determine whether or not said product value is larger than a second threshold value larger than said predetermined value;
   decrease the amplitude of said sinusoidal-wave voltage when it is determined that said product value is smaller than said first threshold value; and
   increase the amplitude of said sinusoidal-wave voltage when it is determined that said product value is not larger than said first threshold value.

9. The video projection apparatus as set forth in claim 1, wherein said control unit is further adapted to:
   generate a second sinusoidal-wave voltage having a same frequency as that of said first sinusoidal-wave voltage and a difference in phase of 90° to said first sinusoidal-wave voltage;
   calculate a first convolution between said first sinusoidal-wave voltage and the sense voltage from said sensor;

calculate a second convolution between said second sinusoidal-wave voltage and the sense voltage of said sensor;

convert an orthogonal coordinate formed by said first convolution and said second convolution into a polar coordinate formed by a radius component and an angle component; and sweep the frequency of said first and second sinusoidal-wave voltages so that the frequency of said first and second sinusoidal-wave voltages is defined as said resonant frequency when said radius component is maximum.

10. The video projection apparatus as set forth in claim 9, wherein said angle component is defined as an optimum angle component when said radius component is maximum, said control unit being further adapted to adjust the frequency of said first and second sinusoidal-wave voltages so that said angle component is brought close to said optimum angle component.

11. The video projection apparatus as set forth in claim 9, said control unit is further adapted to:

determine whether or not said angle component is smaller than said optimum angle component;

increase the frequency of said first and second sinusoidal-wave voltages when it is determined that said angle component is smaller than said optimum angle component; and decrease the frequency of said first and second sinusoidal-wave voltages when it is determined that said angle component is not smaller than said optimum angle component.

12. The video projection apparatus as set forth in claim 9, said control unit is further adapted to:

determine whether or not said angle component is smaller than a first threshold value smaller than said optimum angle component;

determine whether or not said angle component is larger than a second threshold value larger than said optimum angle component;

increase the frequency of said first and second sinusoidal-wave voltages when it is determined that said angle component is smaller than said first threshold value; and decrease the frequency of said first and second sinusoidal-wave voltages when it is determined that said optimum angle component is larger than said second threshold value.

* * * * *